United States Patent
Miyamoto et al.

(10) Patent No.: US 7,025,818 B2
(45) Date of Patent: *Apr. 11, 2006

(54) INK FOR INK JET RECORDING AND INK JET RECORDING PROCESS

(75) Inventors: Akio Miyamoto, Shizuoka (JP); Toshiki Taguchi, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 141 days.

This patent is subject to a terminal disclaimer.

(21) Appl. No.: 10/611,990

(22) Filed: Jul. 3, 2003

(65) Prior Publication Data
US 2004/0055508 A1    Mar. 25, 2004

(30) Foreign Application Priority Data
Jul. 4, 2002    (JP) ................. P. 2002-196112

(51) Int. Cl.
*C09D 11/02*    (2006.01)

(52) U.S. Cl. ............... 106/31.58; 106/31.5; 106/31.58; 106/31.59

(58) Field of Classification Search ............. 106/31.47, 106/31.35, 31.5, 31.58, 31.59, 31.48; 347/100

See application file for complete search history.

(56) References Cited

U.S. PATENT DOCUMENTS

| | | | | | |
|---|---|---|---|---|---|
| 5,980,623 | A | * | 11/1999 | Hiraoka et al. | 106/31.49 |
| 6,039,793 | A | * | 3/2000 | Gundlach et al. | 106/31.28 |
| 2004/0011248 | A1 | * | 1/2004 | Taguchi et al. | 106/31.28 |
| 2004/0080595 | A1 | * | 4/2004 | Taguchi et al. | 347/100 |
| 2004/0189765 | A1 | * | 9/2004 | Taguchi et al. | 347/100 |
| 2004/0194660 | A1 | * | 10/2004 | Taguchi et al. | 106/31.43 |
| 2004/0200385 | A1 | * | 10/2004 | Taguchi et al. | 106/31.43 |
| 2005/0001890 | A1 | * | 1/2005 | Taguchi et al. | 347/100 |

FOREIGN PATENT DOCUMENTS

| EP | 1 340 796 A1 | 9/2003 |
|---|---|---|
| EP | 001375608 A1 * | 1/2004 |

(Continued)

OTHER PUBLICATIONS

Patent Abstracts of Japan—JP 2002 161 225, Jun. 2002.

(Continued)

*Primary Examiner*—Helene Klemanski
(74) *Attorney, Agent, or Firm*—Sughrue Mion, PLLC

(57) ABSTRACT

The present invention provides an ink for ink jet recording, in which the formation of a high-quality image is possible, image keeping quality is excellent, the ink is not dried at an ink jet head, and ejection stability is high, wherein the ink for ink jet recording comprises: at least one dye having a specific structure, in which the at least one dye is dissolved or dispersed in an aqueous medium; and a betaine surfactant, wherein, when the ink has been shaken 30 times or more for 10 seconds and allowed to stand for 3 minutes, a bubble height in the ink is 30 mm or less.

21 Claims, 1 Drawing Sheet

FOREIGN PATENT DOCUMENTS

| | | |
|---|---|---|
| JP | 2003-41162 A | 2/2003 |
| JP | 2003-41163 A | 2/2003 |
| JP | 2003-49100 A | 2/2003 |
| JP | 2003-64275 A | 3/2003 |
| WO | WO 03/066756 A1 | 8/2003 |

FOREIGN PATENT DOCUMENTS

| | | |
|---|---|---|
| EP | 001378550 A1 * | 1/2004 |
| EP | 001473336 A1 * | 11/2004 |
| JP | 2002-53777 A | 2/2002 |
| JP | 2002-309115 A | 10/2002 |
| JP | 2002-309116 A | 10/2002 |
| JP | 2002-309137 A | 10/2002 |
| JP | 2002-322151 A | 11/2002 |
| JP | 2002-371079 A | 12/2002 |
| JP | 2002-371214 A | 12/2002 |
| JP | 2003-41161 A | 2/2003 |

OTHER PUBLICATIONS

Patent Abstracts of Japan—JP 2001 348 518, Dec. 2001.
Patent Abstracts of Japan—JP 2002 121 414, Apr. 2002.
European Search Report dated Oct. 22, 2003.

* cited by examiner

INK FOR INK JET RECORDING AND INK JET RECORDING PROCESS

FIELD OF THE INVENTION

The present invention relates to an ink for ink jet recording high in quality of recorded images, excellent in ejection quality, and moreover, excellent in keeping quality of images obtained.

BACKGROUND OF THE INVENTION

With the recent popularization of computers, ink jet printers have been widely used for making prints on paper, films, cloth and so on, not only in offices but also in homes.

The ink jet recording processes include a system in which ink droplets are ejected by the application of pressure with piezoelectric elements, a system in which bubbles are generated in ink by heat, thereby ejecting ink droplets, a system using a ultrasonic wave and a system in which ink droplets are sucked and ejected by electrostatic force. As inks for ink jet recording used in these systems, aqueous inks, oil-based inks and solid (melt type) inks are used. Of these inks, the aqueous inks have prevailed from the viewpoints of easy production, convenience in handling, odors and safety.

Coloring materials used in these inks for ink jet recording have been required to have excellent solubility in solvents, the possibility of high-density recording, good hues, excellent resistance against light, heat, air, water and chemicals, good fixing properties and the difficulty of blotting to image-receiving materials, excellent keeping quality as the inks, no toxicity, high purity and furthermore availability at low cost. However, it is extremely difficult to seek a coloring material satisfying these requirements at high levels. In particular, a coloring material having a good magenta hue and excellent in light fastness has been strongly desired.

Various dyes and pigments have been already proposed as those for ink jet, and practically used. However, no coloring material satisfying all of these requirements has been discovered yet under the present circumstances. It is difficult to allow both the hue and the fastness required for the inks for ink jet recording to be compatible with each other, by using the dyes and pigments that have hitherto been well known (such as those having Color Index (C.I.) Number).

On the other hand, the problem is encountered that bubbles are generated in the inks in preparing the inks. The presence of bubbles in the inks causes the problem that the inks come not to be normally ejected through nozzles in printing. In order to adjust the properties of the inks and to improve the permeability thereof to paper, surfactants are often added to the inks. In this case, the surfactants cause one factor contributing to the generation of bubbles, so that the problem of bubbles becomes more important.

SUMMARY OF THE INVENTION

Accordingly, an object of the invention is to provide an ink for ink jet recording and an ink jet recording process, in which the formation of a high-quality image is possible, image keeping quality is excellent, the ink is not dried at an ink jet head, and ejection quality is good, from the viewpoints of handling, odors, safety and so on in the aqueous ink.

The object of the invention has been attained by the following (1) to (17):

(1) An ink for ink jet recording comprising:

at least one dye represented by the following general formula (1), in which the at least one dye is dissolved or dispersed in an aqueous medium; and a betaine surfactant, wherein, when the ink has been shaken 30 times or more for 10 seconds and allowed to stand for 3 minutes, a bubble height in the ink is 30 mm or less:

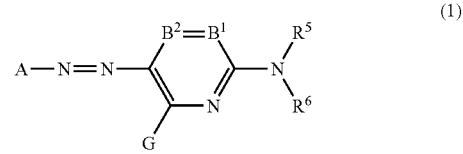

wherein A represents a five-membered heterocyclic group; $B^1$ and $B^2$ each represents =N—, =CR$^1$— or —CR$^2$=, and when one thereof represents =N—, the other represents =CR$^1$— or —CR$^2$=; $R^5$ and $R^6$ each independently represents a hydrogen atom or a substituent group, wherein the substituent group represents an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and a hydrogen atom of each substituent group may be substituted; G, $R^1$ and $R^2$ each independently represents a hydrogen atom or a substituent group, wherein the substituent group represents a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclicthio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and a hydrogen atom of each substituent group may be substituted; and $R^1$ and $R^5$, or $R^5$ and $R^6$ may combine with each other to form a five- or six-membered ring.

(2) An ink for ink jet recording comprising:

at least one dye represented by the following general formula (1), in which the at least dye is dissolved or dispersed in an aqueous medium; and a betaine surfactant, wherein a bubble height in the ink just after the ink has been shaken 30 times or more for 10 seconds, is 50 mm or less:

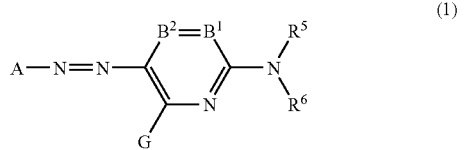
(1)

wherein A represents a five-membered heterocyclic group; $B^1$ and $B^2$ each represents =N—, =CR$^1$— or —CR$^2$=, and when one thereof represents =N—, the other represents =CR$^1$— or —CR$^2$=; $R^5$ and $R^6$ each independently represents a hydrogen atom or a substituent group, wherein the substituent group represents an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and a hydrogen atom of each substituent group may be substituted; G, $R^1$ and $R^2$ each independently represents a hydrogen atom or a substituent group, wherein the substituent group represents a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclicthio group, an alkylsulfonyl group, an arylsulfonyl group, a heterocyclic sulfonyl group, an alkylsulfinyl group, an arylsulfinyl group, a heterocyclicsulfinyl group, a sulfamoyl group or a sulfo group, and a hydrogen atom of each substituent group may be substituted; and $R^1$ and $R^5$, or $R^5$ and $R^6$ may combine with each other to form a five- or six-membered ring.

(3) The ink for ink jet recording according to the item (1) or (2), wherein A in the formula (1) represents a pyrazole ring, an imidazole ring, a thiazole ring, an isothiazole ring, a thiadiazole ring, a benzothiazole ring, a benzoxazole ring or a benzoisothiazole ring, each of which may have a substituent group.

(4) The ink for ink jet recording according to the item (1) or (2), wherein A in the formula (1) is a pyrazole ring, an imidazole ring, an isothiazole ring, a thiadiazole ring or a benzothiazole ring, represented by the following general formulae (a) to (f):

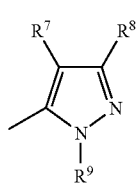
(a)

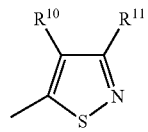
(b)

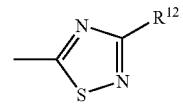
(c)

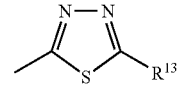
(d)

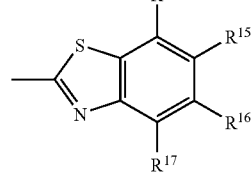
(e)

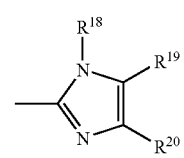
(f)

wherein $R^7$ to $R^{20}$ each has the same definition as with G, $R^1$ and $R^2$ in the general formula (1).

(5) The ink for ink jet recording according to the item (1) or (2), wherein, when the dye represented by the formula (1) is a water-soluble dye, the dye represented by the formula (1) further has anionic hydrophilic group as a substituent group at any position of $R^1$, $R^2$, $R^5$, $R^6$ and G, and the ionic hydrophilic groups is at least one of a sulfo group, a carboxyl group, a phosphono group and a quaternary ammonium group.

(6) The ink for ink jet recording according to the item (1) or (2), wherein the betaine surfactant is a compound having both a cationic site and an anionic site in its molecule and having surface activity, in which the cationic sites include at least one of a nitrogen atom of an amine, a nitrogen atom of a heteroaromatic ring, a phosphorus atom and a boron atom having four bonds with carbon.

(7) The ink for ink jet recording according to the item (1) or (2), which comprises the betaine surfactant in an amount of 0.001 to 50 wt %.

(8) The ink for ink jet recording according to the item (1), wherein a bubble height in the ink just after the ink has been shaken 30 times or more for 10 seconds, is 50 mm or less.

(9) The ink for ink jet recording according to the item (1) or (2), which further comprises an antifoaming agent that is a compound itself existing on a liquid surface in place of a causative substance of foaming, and having no ability to give repulsive force resistant to thinning of a bubble film for itself, in which the antifoaming agent is at least one of alcohols, ethers, fatty acid esters, metal soaps, phosphates, silicones and nonionic surfactants.

(10) The ink for ink jet recording according to the item (9), which further comprises the antifoaming agent in amount of 0.001 to 5 wt %.

(11) The ink for ink jet recording according to the item (1) or (2), wherein the ink is prepared by applying a sonic vibration with energy equivalent to or higher than that of receiving at a recording head, during the process of producing the ink, in order to prevent bubbles from being generated by pressure applied to the ink at the recording head.

(12) The ink for ink jet recording according to the item (1) or (2), wherein the ink is filtrated after an ink solution preparation by a filter having an effective diameter of 1 μm or less.

(13) An ink jet recording process comprising using the ink for ink jet recording according to any one of the items (1) to (12).

(14) An ink jet recording process comprising:
ejecting ink droplets depending on a recording signal onto an image-receiving material comprising a support having provided thereon an image-receiving layer that includes white inorganic pigment particles; and
recording an image on the image-receiving material,
wherein the ink droplets comprise the ink for ink jet recording according to any one of the items (1) to (12).

(15) The ink jet recording process according to the item (14), wherein the support is a chemical pulp, a mechanical pulp or a used paper pulp.

(16) The ink jet recording process according to the item (14), wherein the white inorganic pigment particles is at least one of calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide or zinc carbonate.

(17) The ink jet recording process according to the item (14), wherein an image-receiving material further comprises a back coat layer including a white pigment and an aqueous binder.

DETAILED DESCRIPTION OF THE INVENTION

Figure 1:
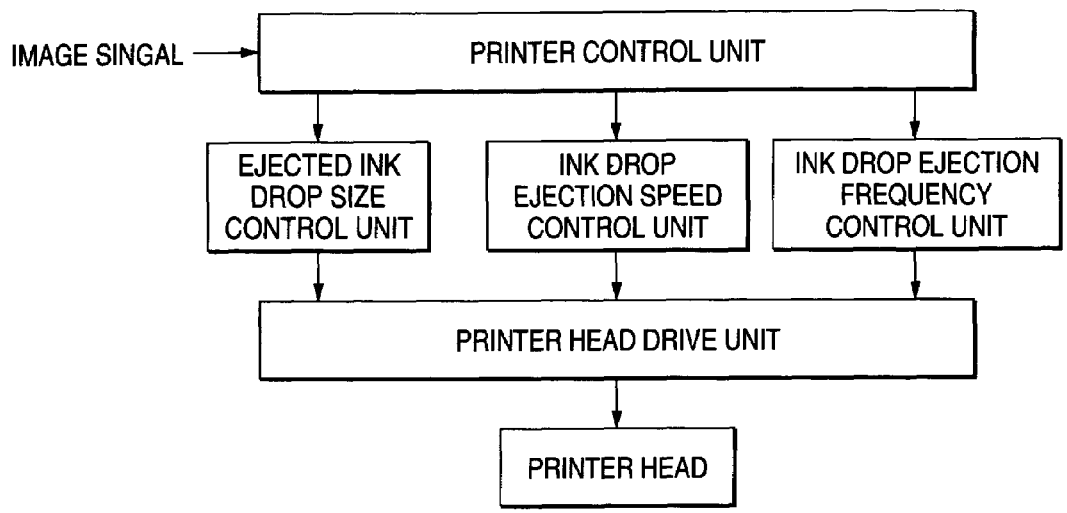
FIG. 1 is a schematic diagram showing an ink jet printer.

The invention will be described below in detail.
First, the dye represented by general formula (1), which is used in the invention, will be described.
The dye used in the ink for ink jet recording of the invention is an azo dye having an aromatic nitrogen-containing six-membered heterocycle as a coupling component, and represented by general formula (1).
In general formula (1), A represents a five-membered heterocyclic group.
$B^1$ and $B^2$ each represents =N—, =$CR^1$— or —$CR^2$=, and when one thereof represents a nitrogen atom, the other represents =$CR^1$— or —$CR^2$=. $R^5$ and $R^6$ each independently represents a hydrogen atom or a substituent group, wherein the substituent group represents an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and a hydrogen atom of each substituent group may be substituted.
G, $R^1$ and $R^2$ each independently represents a hydrogen atom or a substituent group, wherein the substituent group represents a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and a hydrogen atom of each substituent group may be substituted.

$R^1$ and $R^5$, or $R^5$ and $R^6$ may combine with each other to form a five- or six-membered ring.

The dye of general formula (1) will be described in more detail.

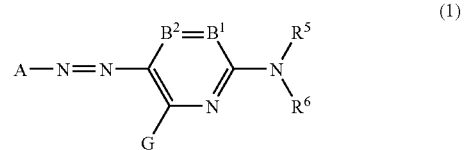

(1)

wherein A represents a five-membered heterocyclic group. Examples of heteroatoms of the heterocycles include N, O and S. The heterocycle is preferably a nitrogen-containing five-membered heterocycle, and an aliphatic ring, an aromatic ring or another heterocycle may be condensed with the heterocycle. Preferred examples of the heterocycles of A include a pyrazole ring, an imidazole ring, a thiazole ring, an isothiazole ring, a thiadiazole ring, a benzothiazole ring, a benzoxazole ring and a benzoisothiazole ring. Each heterocyclic group may further have a substituent group. A pyrazole ring, an imidazole ring, an isothiazole ring, a thiadiazole ring and a benzothiazole represented by the following general formulas (a) to (f) are preferred among others.

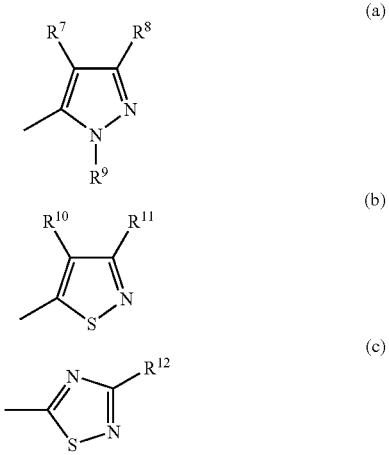

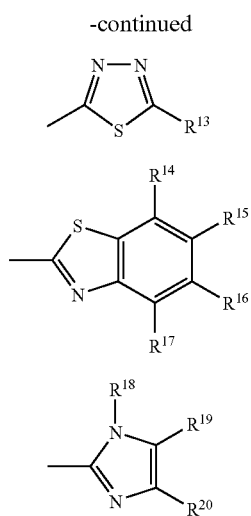

In the above-mentioned general formulas (a) to (f), $R^7$ to $R^{20}$ each represents the same substituent group as with G, $R^1$ and $R^2$ in general formula (1).

Of general formulas (a) to (f), preferred are the pyrazole ring represented by general formula (a) and the isothiazole ring represented by general formula (b), and most preferred is the pyrazole ring represented by general formula (a).

In general formula (1), $B^1$ and $B^2$ each represents =$CR^1$— or —$CR^2$=, or one thereof represents a nitrogen atom, and the other represents =$CR^1$— or —$CR^2$=. However, it is more preferred that each represents =$CR^1$— or —$CR^2$=.

$R^5$ and $R^6$ each independently represents a hydrogen atom or a substituent group, wherein the substituent group represents an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and a hydrogen atom of each substituent group may be substituted.

Examples of $R^5$ and $R^6$ include preferably a hydrogen atom, an aliphatic group, an aromatic group, a heterocyclic group, an acyl group, an alkylsulfonyl group and an arylsulfonyl group, more preferably a hydrogen atom, an aromatic group, a heterocyclic group, an acyl group, an alkylsulfonyl group and an arylsulfonyl group, and most preferably a hydrogen atom, an aryl group and a heterocyclic group. A hydrogen atom of each substituent group may be substituted. However, $R^5$ and $R^6$ are not hydrogen atoms at the same time.

G, $R^1$ and $R^2$ each independently represents a hydrogen atom or a substituent group, wherein the substituent group represents a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and a hydrogen atom of each substituent group may be substituted.

G is preferably a hydrogen atom, a halogen atom, an aliphatic group, an aromatic group, a hydroxyl group, an alkoxyl group, an aryloxy group, an acyloxy group, a heterocyclic oxy group, an amino group, an acylamino group, a ureido group, a sulfamoylamino group, an alkoxycarbonylamino group, an aryloxycarbonylamino group, an alkylthio group, an arylthio group or a heterocyclic thio group, more preferably a hydrogen atom, a halogen atom, an alkyl group, a hydroxyl group, an alkoxyl group, an aryloxy group, an acyloxy group, an amino group or an acylamino group, and most preferably a hydrogen atom, an amino group (preferably, an anilino group) or an acylamino group among others. A hydrogen atom of each substituent group may be substituted.

Preferred examples of $R^1$ and $R^2$ include a hydrogen atom, an alkyl group, a halogen atom, an alkoxycarbonyl group, a carboxyl group, a carbamoyl group, a hydroxyl group, an alkoxyl group and a cyano group. A hydrogen atom of each substituent group may be substituted.

$R^1$ and $R^5$, or $R^5$ and $R^6$ may combine with each other to form a five- or six-membered ring.

When A has a substituent group, or when the substituent group of $R^1$, $R^2$, $R^5$, $R^6$ or G has a further substituent group, the substituent groups include the substituent groups mentioned above for G, $R^1$ and $R^2$.

When the dye of the invention is a water-soluble dye, it is preferred that the dye further has an ionic hydrophilic group as a substituent group at any position of $R^1$, $R^2$, $R^5$, $R^6$ and G. The ionic hydrophilic groups include a sulfo group, a carboxyl group, a phosphono group and a quaternary ammonium group. As the ionic hydrophilic groups, preferred are a carboxyl group, a phosphono group and a sulfo group, and particularly preferred are a carboxyl group and sulfo group.

The carboxyl group, the phosphono group and the sulfo group may be in the salt form. Examples of counter ions forming the salts include an ammonium ion, an alkali metal ion (for example, a lithium ion, a sodium ion or a potassium ion) and an organic cation (for example, a tetramethylammonium ion, a tetramethylguanidium ion or a tetramethylphosphonium ion).

The terms (substituent groups) used in this specification will be described below. These terms are common among different signs in general formula (1) and general formula (1a) described later.

The halogen atoms include a fluorine atom, a chlorine atom and a bromine atom.

The term "aliphatic group" means an alkyl group, a substituted alkyl group, an alkenyl group, a substituted alkenyl group, an alkynyl group, a substituted alkynyl group, an aralkyl group and a substituted aralkyl group. In this specification, the term "substituted" used in the "substituted alkyl group" and so on means that hydrogen atoms existing in the "substituted alkyl group" and so on are substituted by the substituent groups mentioned above for G, $R^1$ and $R^2$.

The aliphatic group may be branched or form a ring. The aliphatic group has preferably 1 to 20 carbon atoms, and more preferably 1 to 16 carbon atoms. An aryl moiety of the aralkyl group or the substituted aralkyl group is preferably a phenyl group or a naphthyl group, and particularly preferably a phenyl group. Examples of the aliphatic groups include methyl, ethyl, butyl, isopropyl, t-butyl, hydroxyethyl, methoxyethyl, cyanoethyl, trifluoromethyl, 3-sulfopropyl, 4-sulfobutyl, cyclohexyl, benzyl, 2-phenethyl, vinyl and allyl.

The term "aromatic group" means an aryl group and a substituted aryl group. The aryl group is preferably a phenyl group or a naphthyl group, and particularly preferably a naphthyl group. The aromatic group has preferably 6 to 20 carbon atoms, and more preferably 6 to 16 carbon atoms.

Examples of the aromatic groups include phenyl, p-tolyl, p-methoxyphenyl, o-chlorophenyl and m-(3-sulfopropylamino)-phenyl.

The heterocyclic group includes a substituted heterocyclic group. In the heterocycle group, an aliphatic ring, an aromatic ring or another heterocycle may be condensed with the heterocycle. The heterocyclic group is preferably a five- or six-membered heterocyclic group. Examples of the substituent groups include an aliphatic group, a halogen atom, an alkylsulfonyl group, an arylsulfonyl group, an acyl group, an acylamino group, a sulfamoyl group, a carbamoyl group and an ionic hydrophilic group. Examples of the heterocyclic groups include 2-pyridyl, 2-thienyl, 2-thiazolyl, 2-benzothiazolyl, 2-benzoxazolyl and 2-furyl.

The carbamoyl group includes a substituted carbamoyl group. Examples of the substituent groups include an alkyl group. Examples of the carbamoyl groups include methylcarbamoyl and dimethylcarbamoyl.

The alkoxycarbonyl group includes a substituted alkoxycarbonyl group. As the alkoxycarbonyl group, an alkoxycarbonyl group having 2 to 20 carbon atoms is preferred. Examples of the substituent groups include an ionic hydrophilic group. Examples of the alkoxycarbonyl groups include methoxycarbonyl and ethoxycarbonyl.

The aryloxycarbonyl group includes a substituted aryloxycarbonyl group. As the aryloxycarbonyl group, an aryloxycarbonyl group having 7 to 20 carbon atoms is preferred. Examples of the substituent groups include an ionic hydrophilic group. Examples of the aryloxycarbonyl groups include phenoxycarbonyl.

The heterocyclic oxycarbonyl group includes a substituted heterocyclic oxycarbonyl group. The heterocycles include the heterocycles mentioned above for the heterocyclic group. As the heterocyclic oxycarbonyl group, a heterocyclic oxycarbonyl group having 2 to 20 carbon atoms is preferred. Examples of the substituent groups include an ionic hydrophilic group. Examples of the heterocyclic oxycarbonyl groups include 2-pyridyloxycarbonyl.

The acyl group includes a substituted acyl group. As the acyl group, an acyl group having 1 to 20 carbon atoms is preferred. Examples of the substituent groups include an ionic hydrophilic group. Examples of the acyl groups include acetyl and benzoyl.

The alkoxyl group includes a substituted alkoxyl group. As the alkoxyl group, an alkoxyl group having 1 to 20 carbon atoms is preferred. Examples of the substituent groups include an alkoxyl group, a hydroxyl group and an ionic hydrophilic group. Examples of the alkoxyl groups include methoxy, ethoxy, isopropoxy, methoxyethoxy, hydroxyethoxy and 3-carboxypropoxy.

The aryloxy group includes a substituted aryloxy group. As the aryloxy group, an aryloxy group having 6 to 20 carbon atoms is preferred. Examples of the substituent groups include an alkoxyl group and an ionic hydrophilic group. Examples of the aryloxy groups include phenoxy, p-methoxyphenoxy and o-methoxyphenoxy.

The heterocyclic oxy group includes a substituted heterocyclic oxy group. The heterocycles include the heterocycles mentioned above for the heterocyclic group. As the heterocyclic oxy group, a heterocyclic oxy group having 2 to 20 carbon atoms is preferred. Examples of the substituent groups include an alkyl group, an alkoxyl group and an ionic hydrophilic group. Examples of the heterocyclic oxy groups include 2-pyridyloxy and 3-thienyloxy.

As the silyloxy group, a silyloxy group substituted by an aliphatic group having 1 to 20 carbon atoms or an aromatic group is preferred. Examples of the silyloxy groups include trimethylsilyloxy and diphenylmethylsilyloxy.

The acyloxy group includes a substituted acyloxy group. As the acyloxy group, an acyloxy group having 1 to 20 carbon atoms is preferred. Examples of the substituent groups include an ionic hydrophilic group. Examples of the acyloxy groups include acetoxy and benzoyloxy.

The carbamoyloxy group includes a substituted carbamoyloxy group. Examples of the substituent groups include an alkyl group. Examples of the carbamoyloxy groups include N-methylcarbamoyloxy.

The alkoxycarbonyloxy group includes a substituted alkoxycarbonyloxy group. As the alkoxycarbonyloxy group, an alkoxycarbonyloxy group having 2 to 20 carbon atoms is preferred. Examples of the alkoxycarbonyloxy groups include methoxycarbonyloxy and isopropoxycarbonyloxy.

The aryloxycarbonyloxy group includes a substituted aryloxycarbonyloxy group. As the aryloxycarbonyloxy group, an aryloxycarbonyloxy group having 7 to 20 carbon atoms is preferred. Examples of the aryloxycarbonyloxy groups include phenoxycarbonyloxy.

The amino group includes a substituted amino group. The substituent groups include an alkyl group, an aryl group and a heterocyclic group. The alkyl group, the aryl group and the heterocyclic group may each further have a substituent group.

The alkylamino group includes a substituted alkylamino group. As the alkylamino group, an alkylamino group having 1 to 20 carbon atoms is preferred. Examples of the substituent groups include an ionic hydrophilic group. Examples of the alkylamino groups include methylamino and ethylamino.

The arylamino group includes a substituted arylamino group. As the arylamino group, an arylamino group having 6 to 20 carbon atoms is preferred. Examples of the substituent groups include a halogen atom and an ionic hydrophilic group. Examples of the arylamino groups include phenylamino and 2-chlorophenylamino.

The heterocyclic amino group includes a substituted heterocyclic amino group. The heterocycles include the heterocycles mentioned above for the heterocyclic group. As the heterocyclic amino group, a heterocyclic amino group having 2 to 20 carbon atoms is preferred. Examples of the substituent groups include an alkyl group, a halogen atom and an ionic hydrophilic group.

The acylamino group includes a substituted acylamino group. As the acylamino group, an acylamino group having 2 to 20 carbon atoms is preferred. Examples of the substituent groups include an ionic hydrophilic group. Examples of the acylamino groups include acetylamino, propionylamino, benzoylamino, N-phenylacetylamino and 3,5-disulfobenzoylamino.

The ureido group includes a substituted ureido group. As the ureido group, a ureido group having 1 to 20 carbon atoms is preferred. Examples of the substituent groups include an alkyl group and an aryl group. Examples of the ureido groups include 3-methylureido, 3,3-dimethylureido and 3-phenylureido.

The sulfamoylamino group includes a substituted sulfamoylamino group. Examples of the substituent groups include an alkyl group. Examples of the sulfamoylamino groups include N,N-dipropylsulfamoylamino.

The alkoxycarbonylamino group includes a substituted alkoxycarbonylamino group. As the alkoxycarbonylamino group, an alkoxycarbonylamino group having 2 to 20 carbon atoms is preferred. Examples of the substituent groups include an ionic hydrophilic group. Examples of the alkoxycarbonylamino groups include ethoxycarbonylamino.

The aryloxycarbonylamino group includes a substituted aryloxycarbonylamino group. As the aryloxycarbonylamino group, an aryloxycarbonylamino group having 7 to 20 carbon atoms is preferred. Examples of the substituent groups include an ionic hydrophilic group. Examples of the aryloxycarbonylamino groups include phenoxycarbonylamino.

The alkylsulfonylamino group and the arylsulfonylamino group include a substituted alkylsulfonylamino group and a substituted arylsulfonylamino group, respectively. As the alkylsulfonylamino group and the arylsulfonylamino group, an alkylsulfonylamino group having 1 to 20 carbon atoms and an arylsulfonylamino group having 6 to 20 carbon atoms are preferred. Examples of the substituent groups include an ionic hydrophilic group. Examples of the alkylsulfonylamino groups and the arylsulfonylamino groups include methylsulfonylamino, N-phenyl-methylsulfonylamino, phenylsulfonylamino and 3-carboxyphenylsulfonylamino.

The heterocyclic sulfonylamino group includes a substituted heterocyclic sulfonylamino group. The heterocycles include the heterocycles mentioned above for the heterocyclic group. As the heterocyclic sulfonylamino group, a heterocyclic sulfonylamino group having 1 to 12 carbon atoms is preferred. Examples of the substituent groups include an ionic hydrophilic group. Examples of the heterocyclic sulfonylamino groups include 2-thienylsulfonylamino and 3-pyridylsulfonylamino.

The alkylthio group, the arylthio group and the heterocyclic thio group include a substituted alkylthio group, a substituted arylthio group and a substituted heterocyclic thio group, respectively. The heterocycles include the heterocycles mentioned above for the heterocyclic group. As the alkylthio group, the arylthio group and the heterocyclic thio group, an alkylthio group having 1 to 20 carbon atoms, an arylthio group having 6 to 20 carbon atoms and a heterocyclic thio group having 2 to 20 carbon atoms are preferred. Examples of the substituent groups include an ionic hydrophilic group. Examples of the alkylthio groups, the arylthio groups and the heterocyclic thio groups include methylthio, phenylthio and 2-pyridylthio, respectively.

The alkylsulfonyl group and the arylsulfonyl group include a substituted alkylsulfonyl group and a substituted arylsulfonyl group, respectively. Examples of the alkylsulfonyl groups and the arylsulfonyl groups include methylsulfonyl and phenylsulfonyl, respectively.

The heterocyclic sulfonyl group includes a substituted heterocyclic sulfonyl group. The heterocycles include the heterocycles mentioned above for the heterocyclic group. As the heterocyclic sulfonyl group, a heterocyclic sulfonyl group having 1 to 20 carbon atoms is preferred. Examples of the substituent groups include an ionic hydrophilic group. Examples of the heterocyclic sulfonyl groups include 2-thienylsulfonyl and 3-pyridylsulfonyl.

The alkylsulfinyl group and the arylsulfinyl group include a substituted alkylsulfinyl group and a substituted arylsulfinyl group, respectively. Examples of the alkylsulfinyl groups and the arylsulfinyl groups include methylsulfinyl and phenylsulfinyl, respectively.

The heterocyclic sulfinyl group includes a substituted heterocyclic sulfinyl group. The heterocycles include the heterocycles mentioned above for the heterocyclic group. As the heterocyclic sulfinyl group, a heterocyclic sulfinyl group having 1 to 20 carbon atoms is preferred. Examples of the substituent groups include an ionic hydrophilic group. Examples of the heterocyclic sulfinyl groups include 4-pyridylsulfinyl.

The sulfamoyl group includes a substituted sulfamoyl group. Examples of the substituent groups include an alkyl group. Examples of the sulfamoyl groups include dimethylsulfamoyl and di-(2-hydroxyethyl)sulfamoyl.

In the invention, particularly preferred is a structure represented by the following general formula (1a):

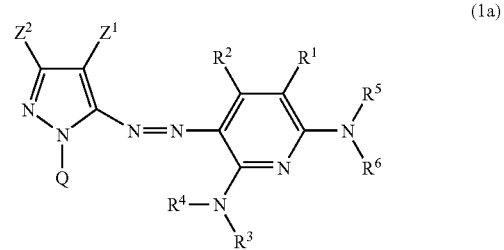

(1a)

wherein $R^1$, $R^2$, $R^5$ and $R^6$ have the same meanings as given in general formula (1).

$R^3$ and $R^4$ each independently represents a hydrogen atom or a substituent group, and the substituent group represents an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group. A hydrogen atom, an aromatic group, a heterocyclic group, an acyl group, an alkylsulfonyl group or an arylsulfonyl group is preferred among others, and a hydrogen atom, an aromatic group or a heterocyclic group is particularly preferred.

$Z^1$ represents an electron attractive group having a Hammett substituent group up constant of 0.20 or more. $Z^1$ is preferably an electron attractive group having a σp constant of 0.30 or more, more preferably an electron attractive group having a σp constant of 0.45 or more, and particularly preferably an electron attractive group having a σp constant of 0.60 or more. However, it is desirable that the σp constant does not exceed 1.0. Preferred specific examples of the substituent groups include electron attractive substituent groups described later. An acyl group having 2 to 20 carbon atoms, an alkyloxycarbonyl group having 2 to 20 carbon atoms, a nitro group, a cyano group, an alkylsulfonyl group having 1 to 20 carbon atoms, an arylsulfonyl group having 6 to 20 carbon atoms, a carbamoyl group having 1 to 20 carbon atoms and an alkyl halide having 1 to 20 carbon atoms are preferred among others. Particularly preferred are a cyano group, an alkylsulfonyl group having 1 to 20 carbon atoms and an arylsulfonyl group having 6 to 20 carbon atoms, and most preferred is a cyano group.

$Z^2$ represents a hydrogen atom or a substituent group, and the substituent group represents an aliphatic group, an aromatic group or a heterocyclic group. $Z^2$ is preferably an aliphatic group, and more preferably an alkyl group having 1 to 6 carbon atoms.

Q represents a hydrogen atom or a substituent group, and the substituent group represents an aliphatic group, an aromatic group or a heterocyclic group. Q is preferably a group comprising nonmetal atoms necessary to form a five- to eight-membered ring among others. The five- to eight-membered ring may be substituted, may be a saturated ring, or may have an unsaturated bond. An aromatic group and a heterocyclic group are particularly preferred among others. Preferred examples of the nonmetal atoms include a nitrogen atom, an oxygen atom, a sulfur atom and a carbon atom. Specific examples of such ring structures include, for example, a benzene ring, a cyclopentane ring, a cyclohexane ring, a cycloheptane ring, a cyclooctane ring, a cyclohexane ring, a pyridine ring, a pyrimidine ring, a pyrazine ring, a pyridazine ring, a triazine ring, an imidazole ring, a benzimidazole ring, an oxazole ring, a benzoxazole ring, a thiazole ring, a benzthiazole ring, an oxane ring, a sulfolane ring and a thiane ring.

A hydrogen atom of each substituent group described in general formula (1a) maybe substituted. The substituent groups include the substituent groups described in general formula (1), the groups exemplified for G, $R^1$ and $R^2$ and ionic hydrophilic groups.

The Hammett substituent group σp constant used in this specification will be described here. Hammett's rule is an empirical rule propounded by L. P. Hammett in 1935 in order to quantitatively deal with the influence of a substituent group on the reaction and equilibrium of a benzene derivative, and the validity thereof has today been widely recognized. As the substituent group constants determined in Hammett's rule, there are the σp constant and the σm constant. These constants are described in detail, for example, in *Lange's Handbook of Chemistry*, the 12th edition, edited by J. A. Dean, 1979 (McGraw-Hill) and *Kagaku no Ryoiki* (Journal of Japanese Chemistry), an extra issue, 122, 96–103 (1979), Nankodo, although they can be found in many general literatures. In the invention, each substituent group is limited or illustrated by the Hammett substituent group σp constant. However, this does not mean that the substituent group is limited to only a substituent group having the constant known in the above-mentioned general literatures. Even when the constant is unknown in literatures, it goes without saying that a substituent group having the constant that will be within the range when measured based on Hammett's rule is also included. Further, although the compounds represented by general formula (1a) also include a compound other than the benzene derivative, the σp constant is used as a measure indicating the electronic efficiency of the substituent group, independently of the substituted position. In the invention, the σp constant is used in such a sense.

Examples of the electron attractive groups having a Hammett substituent group σp constant of 0.60 or more include a cyano group, a nitro group, an alkylsulfonyl group (for example, methylsulfonyl) and an arylsulfonyl group (for example, phenylsulfonyl).

Examples of the electron attractive groups having a Hammett substituent group σp constant of 0.45 or more include, as well as the above-mentioned groups, an acyl group (for example, acetyl), an alkoxycarbonyl group(for example, dodecyloxycarbonyl), an aryloxycarbonyl group (for example m-chloro-phenoxycarbonyl), an alkylsulfinyl group (for example, n-propylsulfinyl), an arylsulfinyl group (for example, phenylsulfinyl), a sulfamoyl group (for example, N-ethylsulfamoyl or N,N-dimethylsulfamoyl) and an alkyl halide group (for example trifluoromethyl).

Examples of the electron attractive groups having a Hammett substituent group σp constant of 0.30 or more include, as well as the above-mentioned groups, an acyloxy group (for example, acetoxy), a carbamoyl group (for example, N-ethylcarbamoyl or N,N-dibutylcarbamoyl), an alkoxyl halide group (for example, trifluoromethyloxy), an aryloxy halide group (for example, pentafluorophenyloxy), a sulfonyloxy group (for example, methylsulfonyloxy), an alkylthio halide group (for example, difluoromethylthio), an aryl group substituted by two or more electron attractive groups having a σp constant of 0.15 or more (for example, 2,4-dinitrophenyl or pentachlorophenyl) and a heterocycle (for example, 2-benzoxazolyl, 2-benzothiazolyl or 1-phenyl-2-benzimidazolyl).

Specific examples of the electron attractive groups having a σp constant of 0.20 or more include, as well as the above-mentioned groups, halogen atom.

As for a particularly preferred combination of the substituent groups in the azo dye represented by general formula (1) described above, $R^5$ and $R^6$ are each preferably a hydrogen atom, an alkyl group, an aryl group, a heterocyclic group, a sulfonyl group or an acyl group, more preferably a hydrogen atom, an aryl group, a heterocyclic group or a sulfonyl group, and most preferably a hydrogen atom, an aryl group or a heterocyclic group. However, there is no case where $R^5$ and $R^6$ both are hydrogen atoms.

G is preferably a hydrogen atom, a halogen atom, an alkyl group, a hydroxyl group, an amino group or an acylamino group, more preferably a hydrogen atom, a halogen atom, an amino group or an acylamino group, and most preferably a hydrogen atom, an amino group or an acylamino group.

A is preferably a pyrazole ring, an imidazole ring, an isothiazole ring, a thiadiazole ring or a benzthiazole ring, ore preferably a pyrazole ring or an isothiazole ring, and most preferably a pyrazole ring.

$B^1$ and $B^2$ are each preferably $=CR^1—$ or $—CR^2=$. $R^1$ and $R^2$ are each preferably a hydrogen atom, an alkyl group, a halogen atom, a cyano group, a carbamoyl group, a carboxyl group, a hydroxyl group, an alkoxyl group or an alkoxycarbonyl group, and more preferably a hydrogen atom, an alkyl group, a carboxyl group, a cyano group or a carbamoyl group.

As for a preferred combination of the substituent groups in the compound represented by general formula (1) described above, the compound in which at least one of various substituent groups is the above-mentioned preferred group is preferred, the compound in which more various substituent groups are the above-mentioned preferred groups is more preferred, and the compound in which all substituent groups are the above-mentioned preferred groups is most preferred.

Specific examples of the azo dyes represented by general formula (1) described above are shown below, but the azo dyes used in the invention should not be construed as being limited to the following examples.

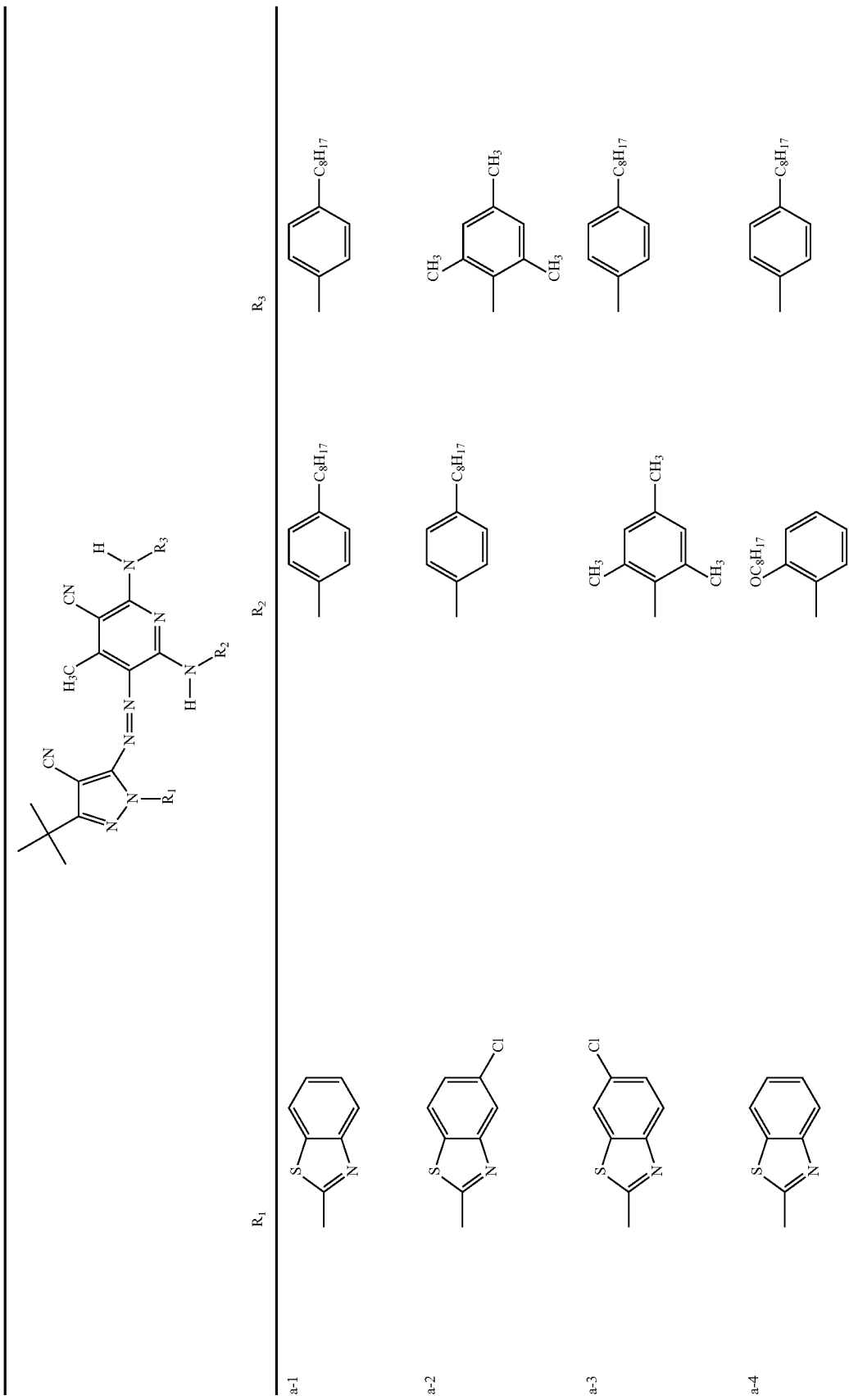

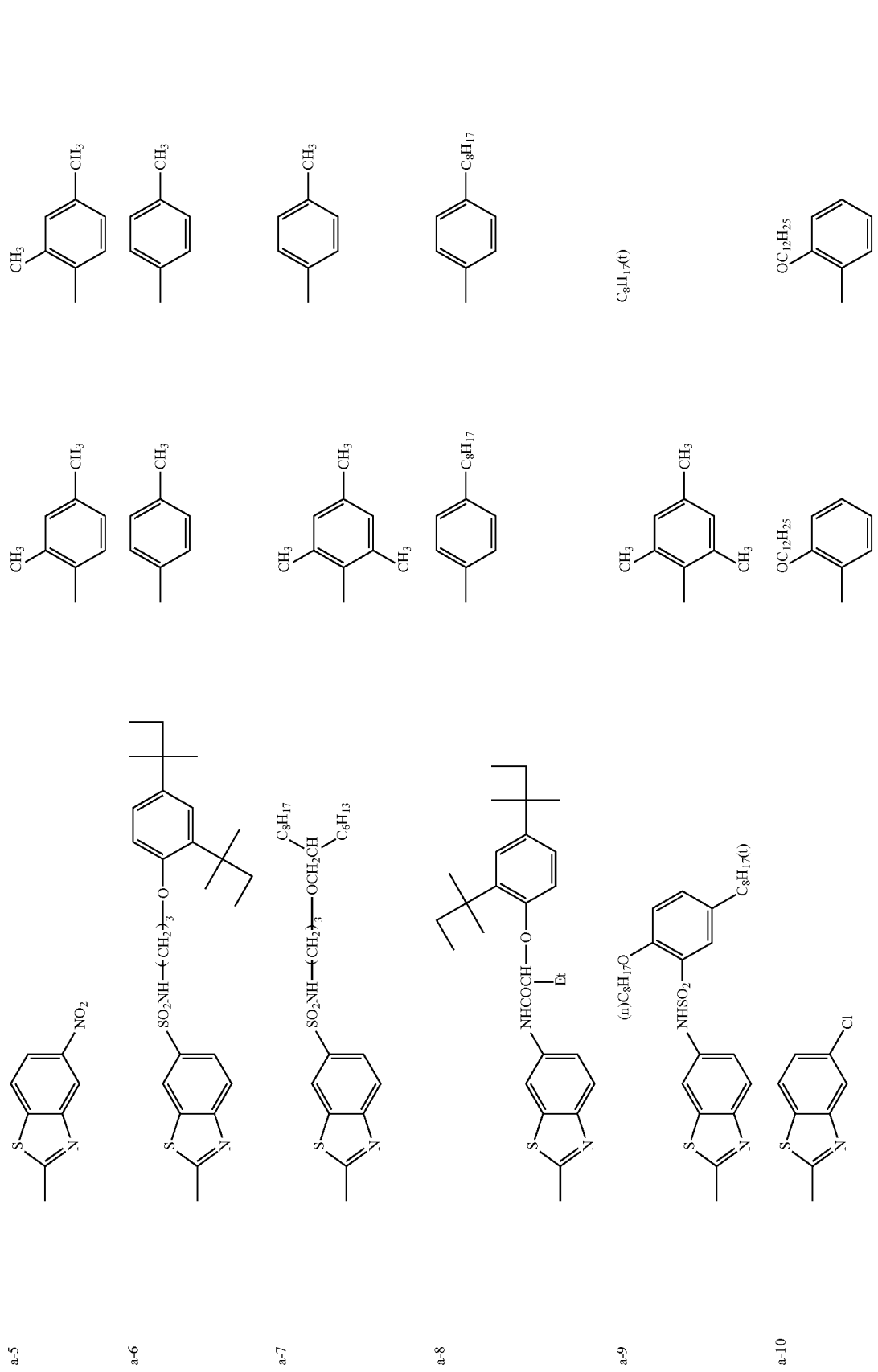

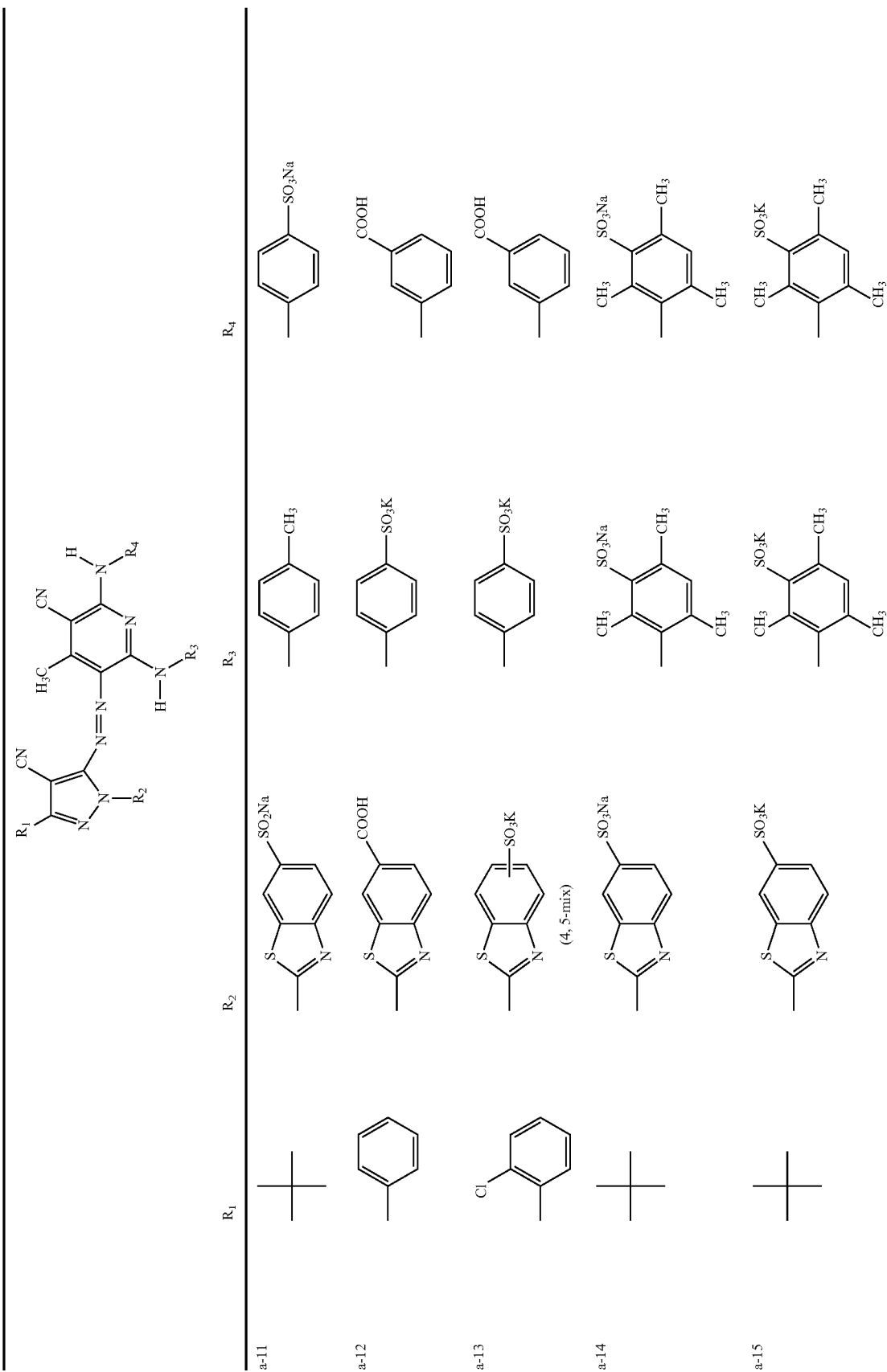

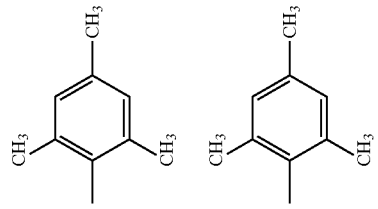
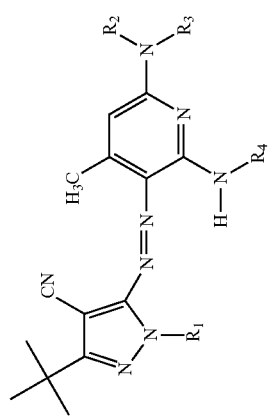
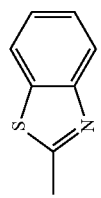
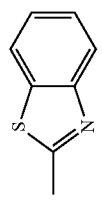

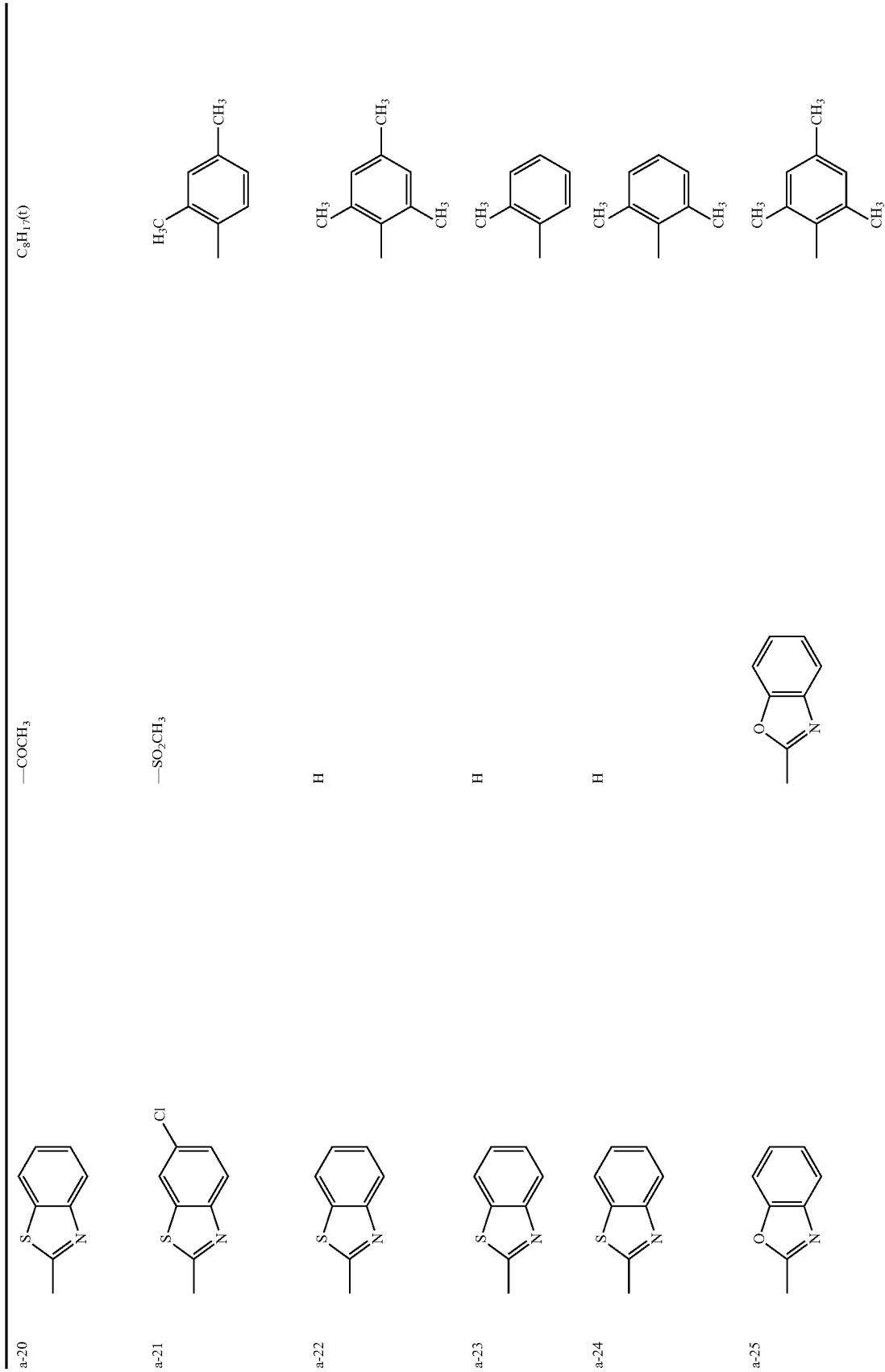

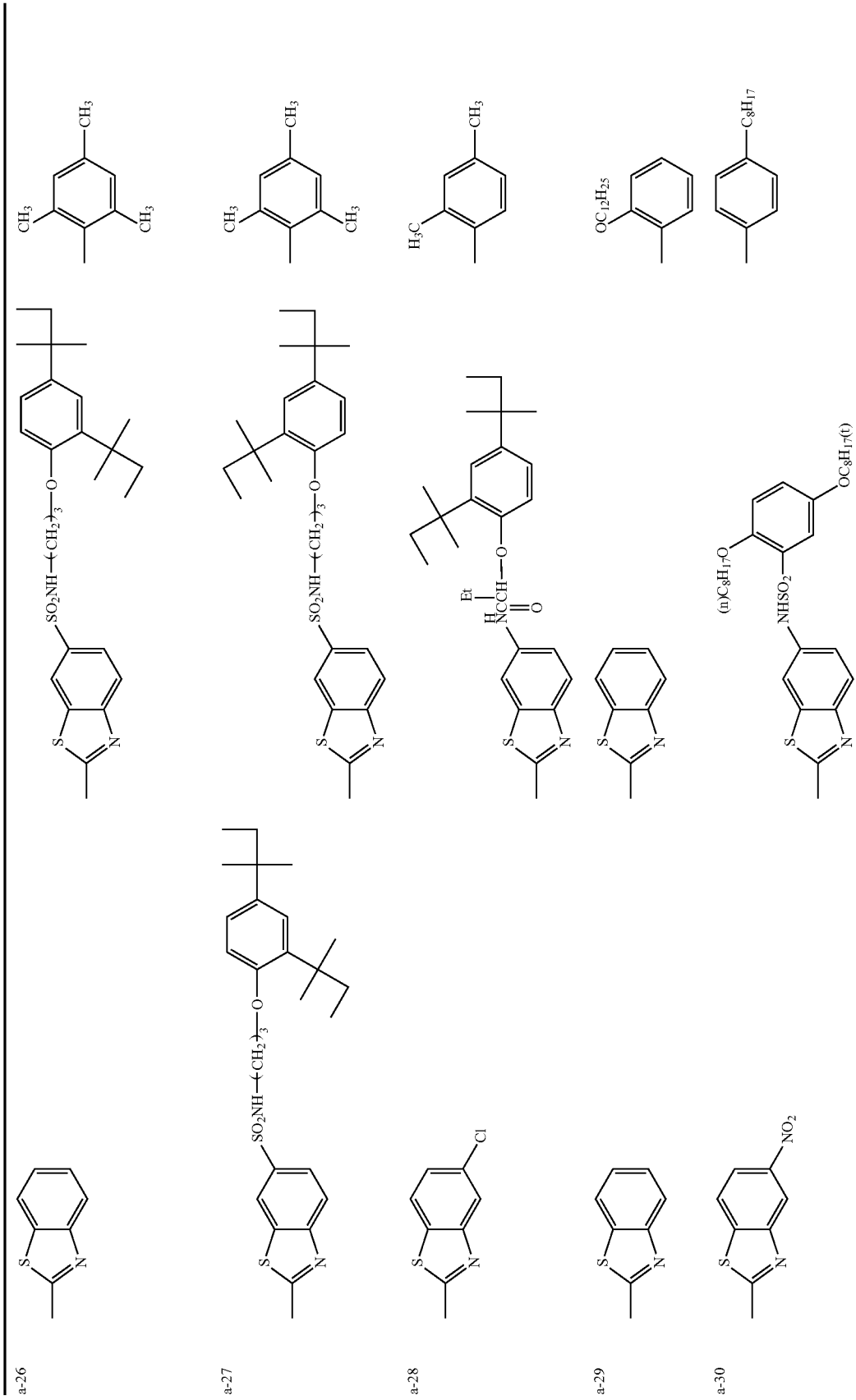

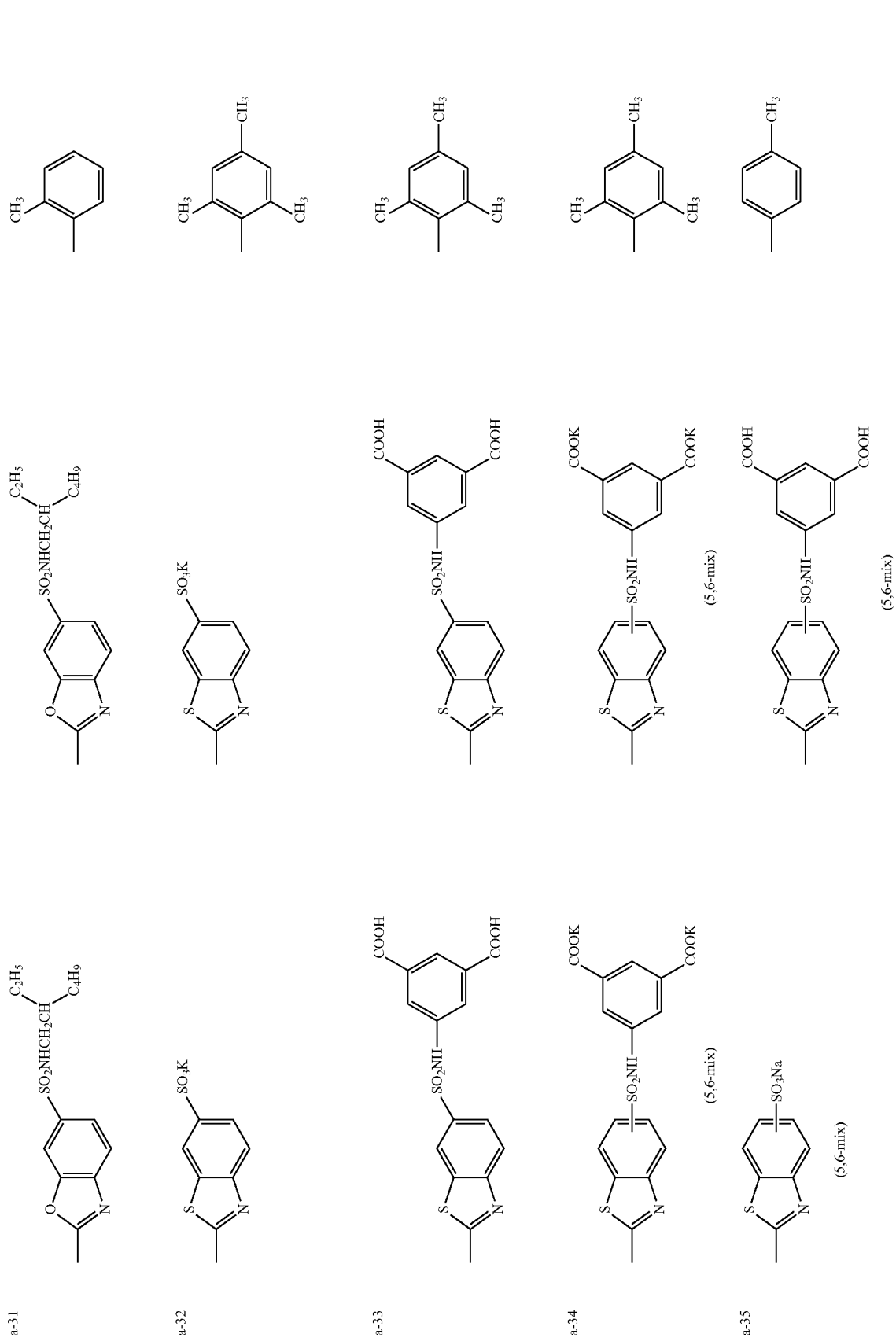

-continued
| | | | | |
|---|---|---|---|---|
| 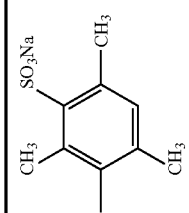 | 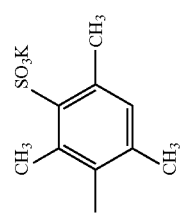 | 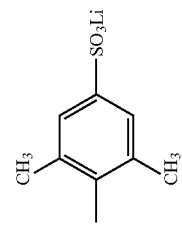 | 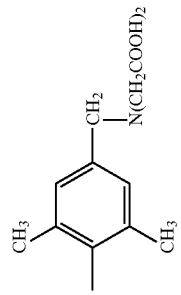 | 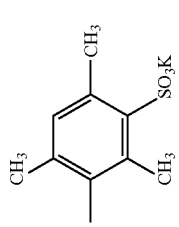 |
| 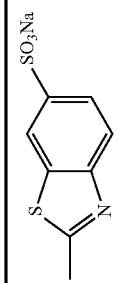 | 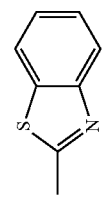 | 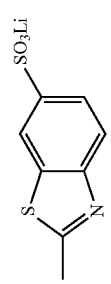 | 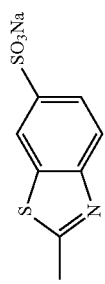 | 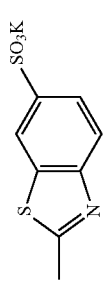 |
| 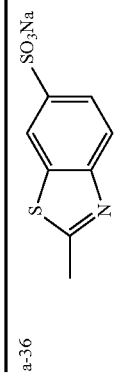 | 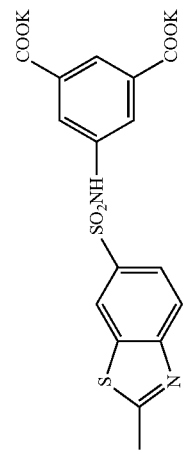 | 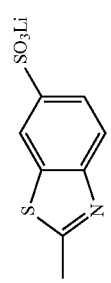 | 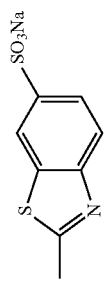 |  |
| a-36 | a-37 | a-38 | a-39 | a-40 |

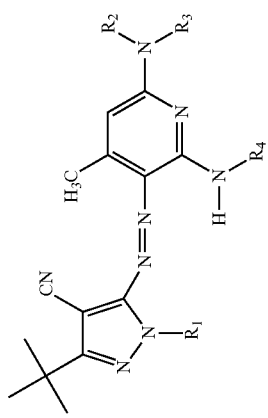
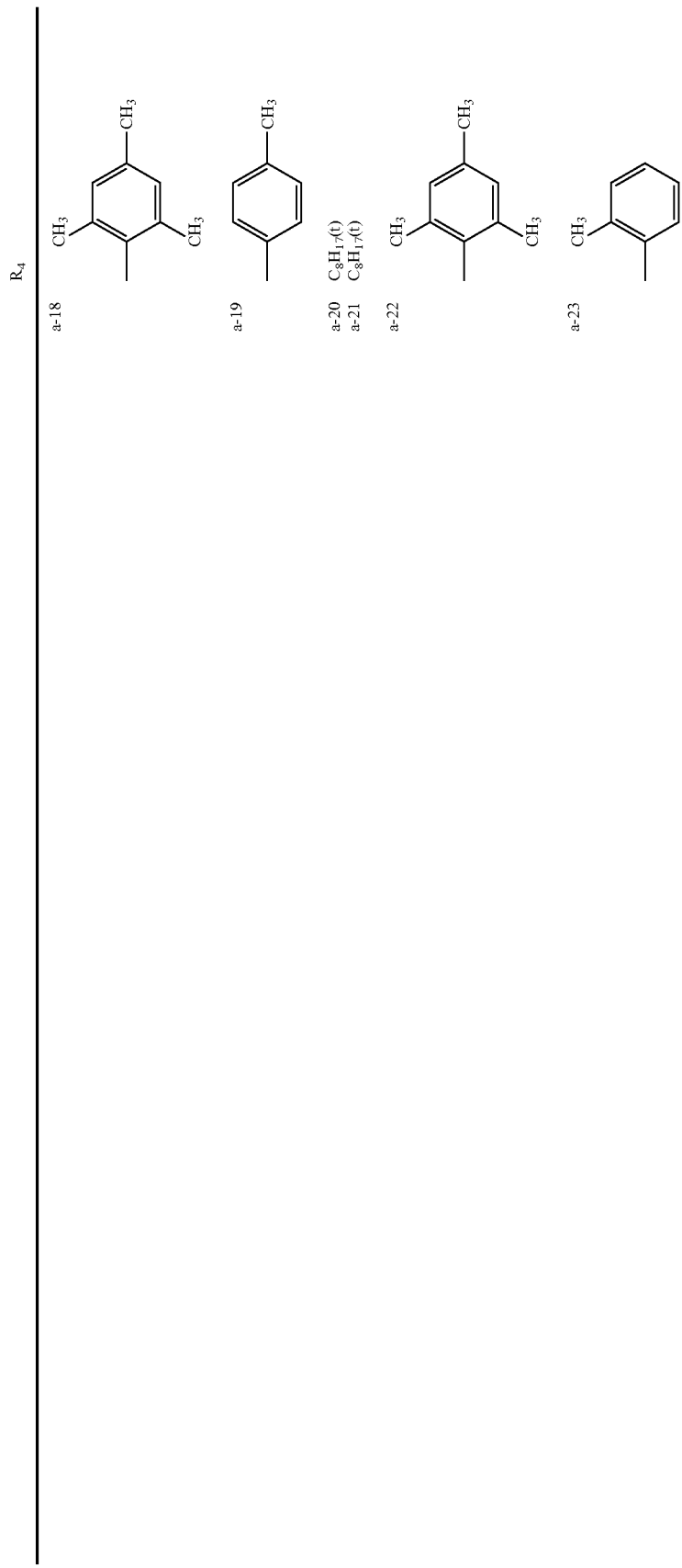

-continued a-24, a-25, a-26, a-27, a-28, a-29, a-30

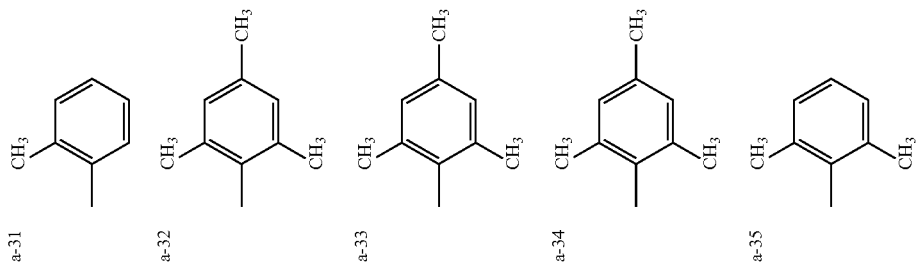

-continued
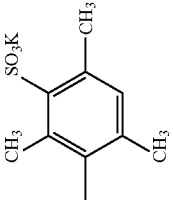
a-36
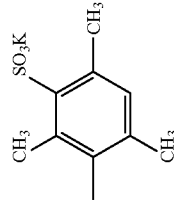
a-37
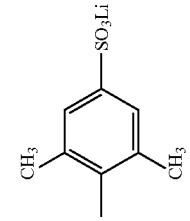
a-38
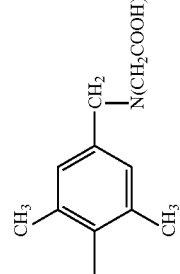
a-39
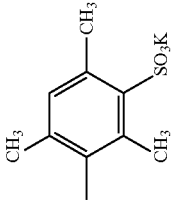
a-40

-continued

| | $R_1$ | $R_2$ | $R_3$ | $R_4$ | $R_5$ | $R_6$ | $R_7$ | $R_8$ |
|---|---|---|---|---|---|---|---|---|
| a-41 | 2-methylphenyl | CN | 2-pyridyl | H | CONH$_2$ | SO$_2$CH$_3$ | 2-OC$_8$H$_{17}$-phenyl | 2-methylphenyl |
| a-42 | t-Bu | Br | 2-pyrimidyl | COOEt | H | benzothiazol-2-yl | C$_8$H$_{17}$(t) | COCH$_3$ |
| a-43 | 2-pyridyl | SO$_2$CH$_3$ | 4,6-bis(NHCH$_3$)-1,3,5-triazin-2-yl | CONH$_2$ | H | 5-Cl-benzothiazol-2-yl | 4-methylphenyl | CO-t-Bu |
| a-44 | t-Bu | CN | 2,4-dicyano-5-methylphenyl | H | H | 5-Cl-benzothiazol-2-yl | 2-methylphenyl | SO$_2$CH$_3$ |

-continued

| | | | | | |
|---|---|---|---|---|---|
| a-45 | ✚ | Br | H | CONH₂ | 3,5-dichloro-4-methylphenyl-NO₂; 3,5-dimethyl-4-methylphenyl; 4-octylphenyl |
| a-46 | ✚ | CN | CH₃ | COCH₃ | 2-methylbenzothiazole; 2,6-diethyl-4-methylphenyl; 2-methylbenzothiazole; 2,6-diethyl-4-methylphenyl |

Structure: isothiazole–azo–pyridine with substituents R₁, R₂, R₃, R₄, R₅, R₆ and CN group

| | R₁ | R₂ | R₃ | R₄ | R₅ | R₆ |
|---|---|---|---|---|---|---|
| b-1 | CH₃ | CH₃ | CN | H | 4-octylphenyl | 2,6-dimethyl-4-methylphenyl |
| b-2 | CH₃ | CH₃ | CN | H | 4-octylphenyl | 2,6-dimethyl-4-methylphenyl |

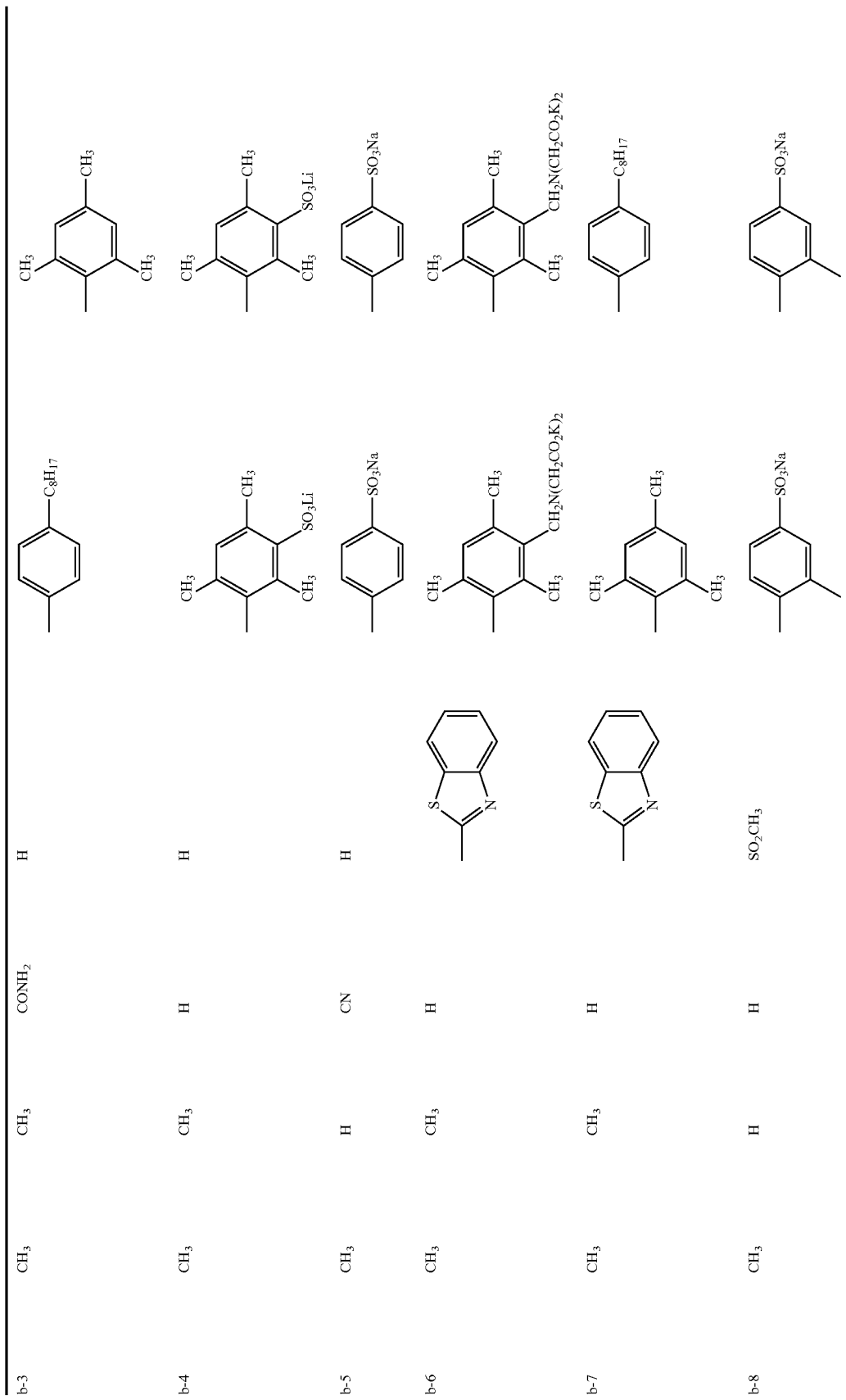

-continued

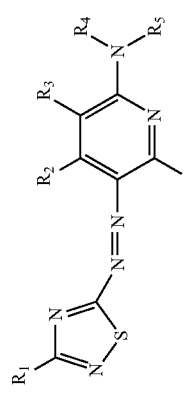

| | $R_1$ | $R_2$ | $R_3$ | $R_4$ | $R_5$ | $R_6$ |
|---|---|---|---|---|---|---|
| c-1 | —SCH$_3$ | CH$_3$ | CN | H | 4-C$_8$H$_{17}$(t)-C$_6$H$_4$— | 4-C$_8$H$_{17}$-C$_6$H$_4$— |
| c-2 | 4-SO$_3$K-C$_6$H$_4$— | H | CONH$_2$ | H | 4-SO$_3$K-C$_6$H$_4$— | 4-SO$_3$K-C$_6$H$_4$— |
| c-3 | —CH$_2$CH$_2$SO$_3$K | CH$_3$ | H | 2-methyl-6-SO$_3$K-benzothiazol-5-yl | 4-SO$_3$K-C$_6$H$_4$— | 4-SO$_3$K-C$_6$H$_4$— |
| c-4 | —CH$_3$ | CH$_3$ | H | 2-methyl-6-SO$_2$NH(CH$_2$)$_3$O-(2,4-di-t-amylphenyl)-benzothiazol-5-yl | 2,4,6-trimethylphenyl | 4-C$_8$H$_{17}$-C$_6$H$_4$— |
| c-5 | C$_6$H$_5$— | H | H | 2-methyl-6-(2-OC$_8$H$_{17}$(n)-5-C$_8$H$_{17}$(t)-phenylsulfonylamino)-benzothiazol-5-yl | 2,4,6-trimethylphenyl | C$_8$H$_{17}$(t) |

-continued
| | R₁ | R₂ | R₃ | R₄ | R₅ | R₆ |
|---|---|---|---|---|---|---|
| d-1 | Me | CH₃ | CN | H |  | 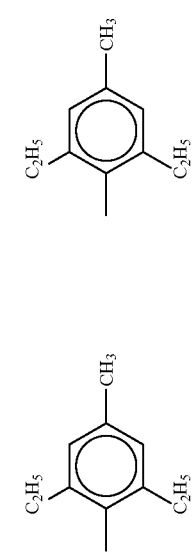 |
| d-2 | Me | CH₃ | CN | H |  |  |
| d-3 | Me | H | H |  |  |  |
| d-4 | Ph | CH₃ | CONH₂ | H |  | (same as R₅) |

-continued
| | | | | |
|---|---|---|---|---|
| d-5 | Ph | CH₃ | H |  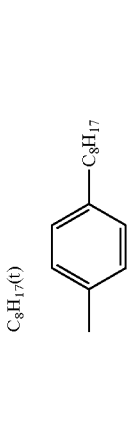 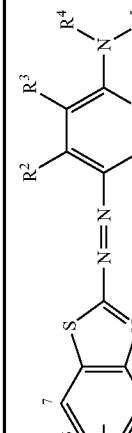 |
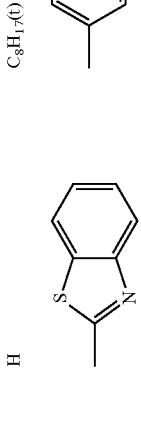
| | R₁ | R₂ | R₃ | R₄ | R₅ | R₆ |
|---|---|---|---|---|---|---|
| e-1 | 5-Cl | CH₃ | CONH₂ | H | $C_8H_{17}(t)$ phenyl | $C_8H_{17}(t)$ phenyl |
| e-2 | 5,6-diCl | H | H | 2-methylbenzothiazole |  | COCH₃ |
| e-3 | 5,6-diCl | CH₃ | H | 2-methylbenzothiazole | | |
| e-4 | 5-CH₃ | H | CN | H | $SO_3K$-phenyl | $SO_3K$-phenyl |

| | | | | | |
|---|---|---|---|---|---|
| e-5 | 5-NO₂ | CH₃ | H | SO₂CH₃ | (2-methylphenyl) / (2,4,6-trimethylphenyl) | f-1: [structure]

f-2: [structure]

The ink for ink jet recording of the invention (also referred to as the ink of the invention) comprises at least one of the above-mentioned azo dyes dispersed or dissolved in an aqueous medium, and contains the azo dye preferably in an amount of 0.2% to 20% by weight, more preferably in an amount of 0.5% to 15% by weight.

In the ink of the invention, in order to adjust a hue for obtaining a full-color image, another dye may be used in combination with the above-mentioned azo dye. Examples of the dyes that can be used together include the following dyes.

Yellow dyes include an arylazo or heterylazo dye having, for example, a phenol, a naphthol, an aniline, a pyrazolone, a pyridone or an open chain type active methylene compound as a coupling component; an azomethine dye having, for example, an open chain type active methylene compound as a coupling component; a methine dye such as a benzylidene dye or a monomethineoxonol dye; and aquinone dye such as a naphthoquinone dye or anthraquinone dye. Other dye species include a quinophthalone dye, a nitro/nitroso dye, an acridine dye and an acridinone dye. These dyes may be ones showing a yellow color only after chromophores partly dissociate. In that case, counter cations may be either inorganic cations such as alkali metals and ammonium or organic cations such as pyridinium and quaternary ammonium salts. Further, the counter cations may also be polymer cations having those as partial structures.

Magenta dyes include an arylazo or heterylazo dye having, for example, a phenol, a naphthol or an aniline as a coupling component; an azomethine dye having, for example, a pyrazolone or a pyrazolotriazole as a coupling component; a methine dye such as an arylidene dye, a styryl dye, a merocyanine dye or an oxonol dye; a carbonium dye such as a diphenylmethane dye, a triphenylmethane dye or a xanthene dye; a quinone dye such as a naphthoquinone dye, an anthraquinone dye or an anthrapyridone dye; and a condensed polycyclic coloring material such as a dioxazine dye. These dyes may be ones showing a yellow color only after chromophores partly dissociate. In that case, counter cations may be either inorganic cations such as alkali metals and ammonium or organic cations such as pyridinium and quaternary ammonium salts. Further, the counter cations may also be polymer cations having those as partial structures.

Cyan dyes include an azomethine dye such as an indoaniline dye or a indophenol dye; a polymethine dye such as a cyanine dye, an oxonol dye or a merocyanine dye; a carbonium dye such as a diphenylmethane dye, a triphenylmethane dye or a xanthene dye; a phthalocyanine dye; an anthraquinone dye; an arylazo or heterylazo dye having, for example, a phenol, a naphthol or an aniline as a coupling component; and an indigo/thioindigo dye. These dyes may be ones showing a yellow color only after chromophores partly dissociate. In that case, counter cations may be either inorganic cations such as alkali metals and ammonium or organic cations such as pyridinium and quaternary ammonium salts. Further, the counter cations may also be polymer cations having those as partial structures.

Further, a black dye such as a polyazo dye can also be used.

Further, a water-soluble dye such as a direct dye, an acid dye, a food dye, a basic dye or a reactive dye can also be used together. Above all, preferred are C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243 and 247; C.I. Direct Violet 7, 9, 47, 48, 51, 66, 90, 93, 94, 95, 98, 100 and 101; C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132; 142; 144; 161 and 163; C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 20, 201, 202, 203, 207, 211, 213, 214, 218, 225, 229, 236, 237, 244, 248, 249, 251, 252, 264, 270, 280, 288, 289 and 291; C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173 and 199; C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397; C.I. Acid Violet 5, 34, 43, 47, 48, 90, 103 and 126; C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227; C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290 and 326; C.I. Acid Black 24, 29, 48, 52:1 and 172; C.I. Reactive Red 3, 13, 17, 19, 21, 22, 23, 24, 29, 35, 37, 40, 41, 43, 45, 49 and 55; C.I. Reactive Violet 1, 3, 4, 5, 6, 7, 8, 9, 16, 17, 22, 23, 24, 26, 27, 33 and 34; C.I. Reactive Yellow 2, 3, 13, 14, 15, 17, 18, 23, 24, 25, 26, 27, 29, 35, 37, 41 and 42; C.I. Reactive Blue 2, 3, 5, 8, 10, 13, 14, 15, 17, 18, 19, 21, 25, 26, 27, 28, 29 and 38; C.I. Reactive Black 4, 5, 8, 14, 21, 23, 26, 31, 32 and 34; C.I. Basic Red 12, 13, 14, 15, 18, 22, 23, 24, 25, 27, 29, 35, 36, 38, 39, 45 and 46; C.I. Basic Violet 1, 2, 3, 7, 10, 15, 16, 20, 21, 25, 27, 28, 35, 37, 39, 40 and 48; C.I. Basic Yellow 1, 2, 4, 11, 13, 14, 15, 19, 21, 23, 24, 25, 28, 29, 32, 36, 39 and 40; C.I. Basic Blue 1, 3, 5, 7, 9, 22, 26, 41, 45, 46, 47, 54, 57, 60, 62, 65, 66, 69 and 71; and C.I. Basic Black 8.

Further, it is also possible to use a pigment together.

As the pigments available in the ink of the invention, known pigments described in various literatures, as well as commercially available pigments, can be utilized. The literatures include *Color Index* (edited by The Society of Dyers and Colourists), *Kaitei Shinpan Ganryo Binran* (Revised New Handbook of Pigments), edited by Nippon Ganryo Gijutsu Kyokai (Japan Pigment Technical Society) (1989), *Saishin Ganryo Oyo Gijutsu* (Latest Pigment Application Technology), CMC Shuppan (1986), *Insatsu Ink Gijutsu* (Print Ink Technology), CMC Shuppan (1984), and W. Herbst and K. Hunger, *Industrial Organic Pigments*, VCH Verlagsgesellschaft (1993). Specifically, organic pigments include an azo pigment (such as an azo lake pigment, an insoluble azo pigment, a condensed azo pigment or a chelate azo pigment), a polycyclic pigment (such as a phthalocyanine pigment, an anthraquinone pigment, a perylene pigment, a perynone pigment, an indigo pigment, a quinacridone pigment, a dioxazine pigment, an isoindolinolene pigment, a quinophthalone pigment or a diketopyrrolopyrrole pigment), a dying lake pigment (such as a lake pigment of an acid or basic dye), and an azine pigment. Inorganic pigments include a yellow pigment such as C.I. Pigment Yellow 34, 37, 42 or 53, a red pigment such as C.I. Pigment Red 101 or 108, a blue pigment such as C.I. Pigment Blue 27, 29 or 17:1, a black pigment such as C.I. Pigment Black 7 or magnetite, and a white pigment such as C.I. Pigment White 4, 6, 18 or 21.

As pigments having preferred hues for image formation, preferred examples of blue or cyan pigments include a phthalocyanine pigment, an indanthrone pigment of the anthraquinone family (for example, C.I. Pigment Blue 60), a triarylcarbonium pigment of the dying lake pigment family. In particular, most preferred is a phthalocyanine pigment. Preferred examples of the phthalocyanine pigments include copper phthalocyanine and monochloro or low chlorinated phthalocyanine such as C.I. Pigment Blue 15:1, 15:2, 15:3, 15:4 and 15:6, aluminum phthalocyanine such as pigments described in European Patent 860475, nonmetal phthalocyanine such as C.I. Pigment Blue 16, and phthalocyanine in which a center metal is Zn, Ni or Ti. Above all, preferred are C.I. Pigment Blue 15:3 and 15:4 and aluminum phthalocyanine.

Red or purple pigments preferably used include an azo pigment (preferred examples thereof include C.I. Pigment Red 3,5, 11, 22, 38, 48:1, 48:2, 48:3, 48:4, 49:1, 52:1, 53:1, 57:1, 63:2, 144, 146 and 184, and above all, preferred are C.I. Pigment Red 57:1, 146 and 184), a quinacridone pigment (preferred examples thereof include C.I. Pigment Red 122, 192, 202, 207 and 209, and C.I. Pigment Violet 19 and 42, and above all, preferred is C.I. Pigment Red 122), a triarylcarbonium pigment of the dying lake pigment family (preferred examples thereof include C.I. Pigment Red 81:1, C.I. Pigment Violet 1, 2, 3, 27 and 29 of the xanthene family), a dioxazine pigment (for example, C.I. Pigment Violet 23 and 37), a diketopyrrolopyrrole pigment (for example, C.I. Pigment Red 254), a perylene pigment (for example, C.I. Pigment Violet 29), an anthraquinone pigment (for example, C.I. Pigment Violet 5:1, 31 or 33) and a thioindigo pigment (for example, C.I. Pigment Red 38 or 88).

Yellow pigments preferably used include an azo pigment (preferred examples thereof include C.I. Pigment Yellow 1, 3, 74 and 98 of the monoazo pigment family, C.I. Pigment Yellow 12, 13, 14, 16, 17 and 83 of the disazo pigment family, C.I. Pigment Yellow 93, 94 95 128 and 155 of the general azo family and C.I. Pigment Yellow 120, 151, 154, 156 and 180 of the benzimidazolone family, and above all, preferred is a pigment in which a benzidine compound is not used as a raw material), an isoindoline/isoindolinone pigment (preferred examples thereof include C.I. Pigment Yellow 109, 110, 137 and 139), a quinophthalone pigment (preferred examples thereof include C.I. Pigment Yellow 138) and a flavanthrone pigment (for example, C.I. Pigment Yellow 24).

Preferred examples of black pigments include an inorganic pigment (preferred examples thereof include carbon black and magnetite) and aniline black.

In addition, an orange pigment (such as C.I. Pigment Orange 13 or 16) or a green pigment (such as C.I. Pigment Green 7) may be used.

The pigments available in the ink of the invention may be either the above-mentioned bare pigments or surface-treated pigments. As surface treatment methods, there are conceived a method of coating a surface of the pigment with a resin or wax, a method of adhering a surfactant to the pigment, and a method of bonding a reactive substance (for example, a silane coupling agent, an epoxy compound, a polyisocyanate or a radical derived from a diazonium salt) to a surface of the pigment, which are described in the following literatures and patents:

(1) *Kinzoku Sekken no Seishitsu to Oyo* (Properties and Application of Metal Soaps) (Saiwai Shobo);

(2) *Insatsu Ink Gijutsu* (Print Ink Technology), CMC Shuppan (1984);

(3) *Saishin Ganryo Oyo Gijutsu* (Latest Pigment Application Technology), CMC Shuppan (1986);

(4) U.S. Pat. Nos. 5,554,739 and 5,571,311; and (5) JP-A-9-151342, JP-A-10-140065, JP-A-10-292143 and JP-A-11-166145.

In particular, self-dispersible pigments prepared by allowing diazonium salts described in the U.S. Patens of the above (4) to react with carbon black, and encapsulated pigments prepared by methods described in the Japanese Patents of the above (5) are particularly effective, because dispersion stability is obtained without using excess dispersing agents in inks.

In the ink of the invention, the pigment may be dispersed by further use of a dispersing agent. As the dispersing agents, there can be used various know agents, for example, surfactant type low molecular weight dispersing agents and polymer type dispersing agents, depending on the pigment to be used. Examples of the dispersing agents include ones described in JP-A-3-69949 and European Patent 549486. Further, in order to enhance adsorption of the dispersing agent on the pigment in using the dispersing agent, a pigment derivative called a synergist may be added.

The particle size of the pigment available in the ink of the invention is preferably within the range of 0.01 to 10 µm, and more preferably within the range of 0.05 to 1 µm, after dispersion.

As methods for dispersing the pigments, known dispersing techniques used in ink production or toner production can be employed. Dispersing devices include an agitator mill, an attritor, a colloid mill, a ball mill, a sand mill, a three-roll mill, a pearl mill, a super mill, an impeller, a disperser, a KD mill, a dynatron and a pressure mil. Details thereof are described in *Saishin Ganryo Oyo Gijutsu* (Latest Pigment Application Technology), CMC Shuppan (1986).

Then, the surfactant that can be contained in the ink of the invention will be described.

The surfactant is added to the ink for ink jet recording of the invention to adjust liquid properties of the ink, thereby being able to improve ejection stability of the ink and to obtain excellent effects in regard to improvement in water resistance of an image and prevention of a blot of the printed ink.

In the invention, various surfactants can be used for the above-mentioned purpose. However, it is necessary to use a betaine surfactant among others. The term "betaine surfactant" as used herein is understood to also include, for example, one used in dispersion of an oil-soluble dye.

The term "betaine surfactant" as used herein means a compound having both a cationic site and an anionic site in its molecule, and having surface activity. The cationic sites include a nitrogen atom of an amine, a nitrogen atom of a heteroaromatic ring, a boron atom having four bonds with carbon, and phosphorus atom. Above all, preferred are a nitrogen atom of an amine and a nitrogen atom of a heteroaromatic ring. In particular, a quaternary nitrogen atom is preferred among others. The anionic sites include a hydroxyl group, a thio group, a sulfonamide group, a sulfo group, a carboxyl group, an imido group, a phosphoric acid group and a phosphonic acid group, of these, a carboxyl group and a sulfo group are particularly preferred. The charge of the entire surfactant maybe cationic, anionic or neutral, but is preferably neutral.

The betaine surfactant is preferably added over a wide amount range (including the amount used in dispersion of the dye). However, the amount of the betaine surfactant added is preferably from 0.001% to 50% by weight, and more preferably from 0.01% to 20% by weight, based on the ink composition.

Specific examples of the betaine surfactants are shown below, but the scope of the invention should not be construed as being limited thereby.

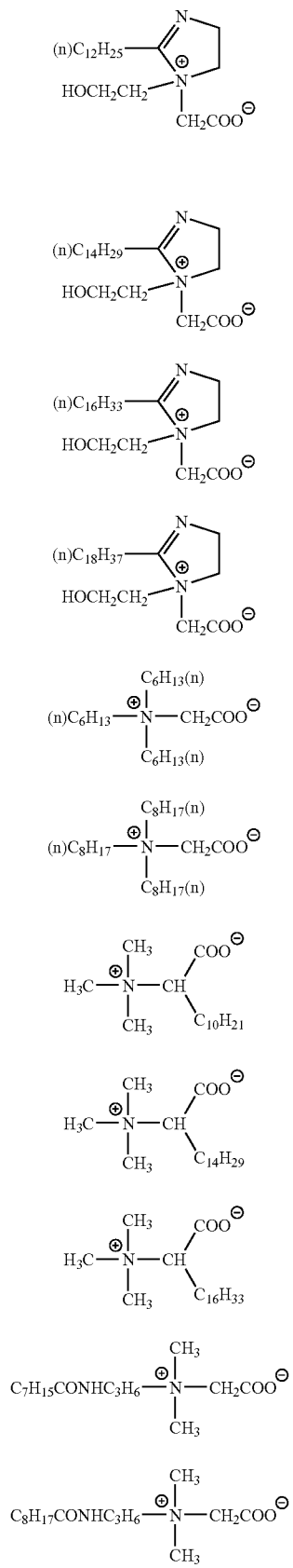

| | |
|---|---|
| W-1 | C₁₁H₂₃CONHC₃H₆—N⁺(CH₃)₂—CH₂COO⁻  (W-12) |
| W-2 | C₁₃H₂₇CONHC₃H₆—N⁺(CH₃)₂—CH₂COO⁻  (W-13) |
| W-3 | C₁₅H₃₁CONHC₃H₆—N⁺(CH₃)₂—CH₂COO⁻  (W-14) |
| W-4 | C₁₇H₃₅CONHC₃H₆—N⁺(CH₃)₂—CH₂COO⁻  (W-15) |
| W-5 | C₁₇H₃₁CONHC₃H₆—N⁺(CH₃)₂—CH₂COO⁻  (W-16) |
| W-6 | (n)C₁₆H₃₃—N⁺(CH₃)₂—CH₂CH(OH)—CH₂SO₃⁻  (W-17) |
| W-7 | (n)C₁₈H₃₇—N⁺(CH₃)₂—CH₂CH(OH)—CH₂SO₃⁻  (W-18) |
| W-8 | C₁₂H₂₅(CH₃)₂N⁺CH₂COO⁻  (W-19) |
| W-9 | C₁₈H₃₇(CH₃)₂N⁺CH₂COO⁻  (W-20) |
| W-10 | C₁₂H₂₅(CH₃)₂N⁺CH₂CH(OH)CH₂SO₃⁻  (W-21) |

The ink for ink jet recording of the invention can be prepared by dissolving and/or dispersing the azo dye and the surfactant in an aqueous medium. The term "aqueous medium" as used in the invention means a medium in which an additive such as a wetting agent, a stabilizing agent or a preservative is added to water or a mixture of water and a small amount of a aqueous-miscible organic solvent as needed.

When the ink solution of the invention is prepared, it is preferred that the azo dye and the surfactant are first dissolved in water, in the case of water-soluble ink. Then, various solvents and additives are added, dissolved and mixed to form the homogeneous ink solution.

As dissolving methods used in this case, various methods such as dissolution by stirring, dissolution by irradiation of an ultrasonic wave and dissolution by shaking are available. The stirring method is particularly preferably used among others. When stirring is carried out, various systems such as fluid stirring and stirring utilizing a shear force by use of a reversing agitator or a dissolver, which are known in the art, can be utilized. On the other hand, a stirring method utilizing a shear force against a bottom of a vessel can be preferably utilized, as conducted using a magnetic stirrer.

As for preparation methods of aqueous inks for ink jet recording, details thereof are described in JP-A-5-148436, JP-A-5-295312, JP-A-7-97541, JP-A-7-82515, JP-A-7-118584, Japanese Patent Application Nos. 2000-200780 and 2000-249799. These methods can also be used in the preparation of the ink for ink jet recording of the invention.

Examples of the aqueous-miscible organic solvents available in the invention include an alcohol (for example, methanol, ethanol, propanol, isopropanol, butanol, isobutanol, sec-butanol, t-butanol, pentanol, hexanol, cyclohexanol or benzyl alcohol), a polyhydric alcohol (for example, ethylene glycol, diethylene glycol, triethylene glycol, polyethylene glycol, propylene glycol, dipropylene glycol, polypropylene glycol, butylene glycol, hexanediol, pentanediol, glycerol, hexanetriol or thiodiglycol), aglycol derivative (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, propylene glycol monomethyl ether, triethylene glycol monomethyl ether, ethylene glycol diacetate, ethylene glycol monomethyl ether acetate, triethylene glycol monoethyl ether or ethylene glycol monophenyl ether), an amine (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine or tetramethylpropylenediamine), and another polar solvent (for example, formamide, N,N-dimethyl-formamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile or acetone). The above-mentioned aqueous-miscible organic solvents may be used as a combination of two or more of them.

When the above-mentioned azo dye is an oil-soluble dye, the ink can be prepared by dissolving the oil-soluble dye in a high boiling organic solvent, and dispersing the resulting solution in an aqueous medium by emulsification.

The boiling point of the high boiling organic solvent used in the invention is preferably 150° C. or more, and more preferably 170° C. or more.

The high boiling organic solvents include, for example, aphthalate (for example, dibutylphthalate, dioctylphthalate, dicyclohexyl phthalate, di-2-ethylhexyl phthalate, decyl phthalate or bis(2,4-di-tert-amylphenyl) isophthalate, bis(1,1-diethylpropyl)phthalate), a phosphoric or phosphonic ester (for example, diphenyl phosphate, triphenyl phosphate, tricresyl phosphate, 2-ethylhexyldiphenyl phosphate, di-octylbutyl phosphate, tricyclohexyl phosphate, tri-2-ethylhexyl phosphate, tridodecyl phosphate or di-2-ethyl-hexylphenyl phosphate), a benzoate (for example, 2-ethylhexyl benzoate, 2,4-dichlorobenzoate, dodecyl benzoate or 2-ethylhexyl p-hydroxybenzoate), an amide (for example, N,N-diethyldodecaneamide or N,N-di-ethyllaurylamide), an alcohol (for example, isostearyl alcohol), an aliphatic ester (for example, dibutoxyethyl succinate, di-2-ethylhexyl succinate, 2-hexyldecyl tetra-decanoate, tributyl citrate, diethyl azelate, isostearyl lactate or trioctyl citrate), an aniline derivative (for example, N,N-dibutyl-2-butoxy-5-tert-octylaniline), a chlorinated paraffin (for example, a paraffin having a chlorine content of 10% to 80%), a trimesate (for example, tributyl trimesate), dodecylbenzene, diisopropylnaphthalene, a phenol (for example, 2,4-di-tert-amylphenol, 4-dodecyloxyphenol, 4-dodecyloxy-carbonylphenol or 4-(4-dodecyloxyphenylsulfonyl)phenol), a carboxylic acid (for example, 2-(2,4-di-tert-amylphenoxy)-butyric acid or 2-ethoxyoctanedecanoic acid), and an alkylphosphoric acid (for example, di (2-ethylhexyl)phosphoric acid or diphenylphosphoric acid)

The high boiling organic solvent can be used in a 0.01- to 3-fold excess amount, preferably in a 0.01- to 1.0-fold excess amount, by weight in relation to the oil-soluble dye.

These high boiling organic solvents may be used either alone or as a mixture of several kinds of them (for example, tricresyl phosphate and dibutyl phthalate, trioctyl phosphate and di(2-ethylhexyl) sebacate, and dibutyl phthalate and poly(N-t-butylacrylamine)).

Compound examples of the high boiling organic solvents other than the above, which are used in the invention, and methods for synthesizing these high boiling organic solvents are described, for example, in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-A-276,319, EP-A-286,253, EP-A-289,820, EP-A-309,158, EP-A-309,159, EP-A-309,160, EP-A-509,311, EP-A-510,576, East German Patents 147,009, 157,147, 159,573 and 225,240A, British Patent 2,091, 124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946 and JP-A-4-346338.

In the invention, the oil-soluble dye and the high boiling organic solvent are emulsified in the aqueous medium, and then used as an emulsified dispersion. In dispersing them by emulsification, a low boiling organic solvent can be used in combination with them from the viewpoint of the emulsifying property in some cases. The low boiling organic solvent that can be used in combination is an organic solvent having a boiling point of about 30° C. to 150° C. at ordinary pressure. Examples of the low boiling organic solvents preferably used include but are not limited to an ester (for example, ethyl acetate, butyl acetate, ethyl propionate, β-ethoxyethyl acetate or methyl cellosolve acetate), an alcohol (for example, isopropyl alcohol, n-butyl alcohol or sec-butyl alcohol), a ketone (for example, methyl isobutyl ketone, methyl ethyl ketone or cyclohexanone), an amide (for example, dimethylformamide or N-methylpyrrolidone) and an ether (for example, tetra-hydrofuran or dioxane).

Dispersion by emulsification is carried out in order to disperse an oil phase in which the dye is dissolved in the high boiling organic solvent or in the mixed solvent of the high boiling organic solvent and the low boiling organic solvent in some cases into an aqueous phase mainly composed of water to form micro oil droplets of the oil phase. In this case, additives such as a surfactant, a wetting agent, a dye stabilizing agent, an emulsion stabilizer, a preservative and a fungicide, which are described later, can be added as needed.

As the emulsification method, a method of adding the oil phase to the aqueous phase is general. However, a so-called phase inversion emulsification method of adding the aqueous phase to the oil phase is also preferably usable.

In dispersion by emulsification in the invention, various surfactants can be used. Preferred examples thereof include an anionic surfactant such as a fatty acid salt, an alkylsulfate, an alkylbenzenesulfonate, alkylnaphthalenesulfonate, a dialkylsulfosuccinate, an alkylphosphate, a naphthalene-sulfonic acid-formalin condensation product or a poly-oxyethylenealkylsulfate; and nonionic surfactant such as a polyoxyethylene alkyl ether, a polyoxyethylene alkyl allyl ether, a polyoxyethylene fatty acid ester, a sorbitan fatty acid ester, a polyoxyethylene sorbitan fatty acid ester, a polyoxyethylenealkylamine, a glycerol fatty acid ester or an oxyethyleneoxypropylene block copolymer. SURFYNOLS (Air Products & Chemicals), acetylenic polyoxyethylene oxide surfactants, are also preferably used. Further, amine oxide type amphoteric surfactants such as an N,N-dimethyl-N-alkylamine oxide are also preferred. Furthermore, surfactants described in JP-A-59-157636, pages 37 and 38, and *Research Disclosure* No. 308119 (1989) can also be used.

The surfactants used in the emulsification are different in the purpose from the above-mentioned surfactant added in order to adjust the liquid properties of the ink for ink jet recording. However, the same types of surfactants can be used. As a result, the function of adjusting the properties of the ink can also be performed.

In order to stabilize a dye dispersion just after emulsification, a water-soluble polymer can also be added in combination with the above-mentioned surfactant. As the water-soluble polymers, there are preferably used polyvinyl alcohol, polyvinyl pyrrolidone, polyethylene oxide, polyacrylic acid, polyacrylamide and copolymers of them. Natural water-soluble polymers such as a polysaccharide, casein and gelatin are also preferably used.

Further, in order to stabilize the dye dispersion, a polyvinyl compound, a polyurethane, a polyester, a polyamide, a polyurea or a polycarbonate obtained by polymerization of an acrylate, a methacrylate, a vinyl ester, an acrylamide, a methacrylamide, an olefin, a styrene, a vinyl ether and an acrylonitrile, which is substantially insoluble in the aqueous medium, can also be used in combination. It is preferred that these polymers contain —$SO^{2-}$ or —$COO^-$. When each of these polymer substantially insoluble in the aqueous medium is used in combination, it is used preferably in an amount of 20% by weight or less, and more preferably in an amount of 10% by weight or less, based on the high boiling organic solvent.

When dispersion by emulsification disperses the oil-soluble dye and the high boiling organic solvent to prepare the aqueous ink, particularly important is the control of their particle size. In order to increase color purity and density in forming an image by ink jet, it is indispensable to decrease the average particle size. The volume average particle size is preferably 1 μm or less, and more preferably from 5 to 100 nm.

When the volume average particle size and the particle size distribution of the above-mentioned dispersed particles, they can be easily measured by known methods described in *Jikken Kagaku Koza* (Experimental Chemistry Course), the 4th edition, pages 417 and 418, as well as the static light scattering method, the dynamic light scattering method and the centrifugal sedimentation method.

For example, the ink is diluted with distilled water to bring the concentration of the particles contained in the ink to 0.1% to 1% by weight, and the particle size thereof can be easily measured with a commercially available device for measuring the volume average particle size (for example, Microtruck UPA manufactured by Nikkiso Co., Ltd.). Further, the dynamic light scattering method utilizing the laser Doppler effect is particularly preferred, because the particle size can be measured to small size.

The term "volume average particle size" means the average particle size weighted by the particle volume, and is obtained by dividing the sum of the products of the diameters of the respective particles and the volumes thereof by the total volume of the particles, in a collection of the particles. The volume average particle size is described in Soichi Muroi, *Kobunshi Latex no Kagaku* (Chemistry of Polymer Latexes), Kobunshi Kankokai, page 119.

Further, it has become clear that the presence of coarse particles plays a very major role in printing performance. That is to say, it has been revealed that the coarse particles clog nozzles of a head, or form stains, even when the coarse particles do not clog the nozzles, which causes the failure of ink ejection or the distortion of ink ejection to exert an important influence on the printing performance. In order to prevent this, it is important that particles having a size of 5 μm or more contained in the ink is reduced to 10 particles or less, and that particles having a size of 1 μm or more is reduced to 1,000 particles or less.

As methods for removing these coarse particles, known centrifugation and microfiltration can be used. These separating means may be applied either just after dispersion by emulsification, or after various additives such as the wetting agent and the surfactant have been added to the emulsified dispersion and just before the resulting dispersion is loaded in an ink cartridge.

As an effective means for reducing the average particle size and removing coarse particles, a mechanical emulsifier can be used.

As the emulsifiers, known apparatus such as a simple stirrer or impeller stirring system, an inline stirring system, a mill system such as a colloid mill, and an ultrasonic system can be used. However, the use of a high-pressure homogenizer is particularly preferred.

As for the high-pressure homogenizer, a detailed mechanism thereof is described in U.S. Pat. No. 4,533,254 and JP-A-6-47264. As commercially available apparatus, there are a Gaulin homogenizer (A. P. V. GAULIN INC.), a Microfluidizer (MICROFLUIDEX INC.) and an Ultimizer (Sugino Machine Limited).

The high-pressure homogenizer having a mechanism of finely pulverizing particles in ultra-high pressure jet streams, which has recently been used and is described in U.S. Pat. No. 5,720,551, is particularly effective. Examples of the emulsifiers using the ultra-high pressure jet streams include DeBEE 2000 (BEE INTERNATIONL LTD.).

When the emulsification is conducted with the high-pressure emulsifying disperser, the pressure is 50 MPa or more, preferably 60 MPa or more, and more preferably 180 MPa or more. It is particularly preferred that two or more types of emulsifiers are used in combination, for example, that the dye dispersion is emulsified with the stirring emulsifier and then passed through the high-pressure homogenizer. It is also preferred that the dye dispersion is once emulsified with the emulsifier, and then passed through the high-pressure homogenizer again after additives such as the wetting agent and the surfactant have been added and before the resulting ink is loaded in an ink cartridge.

When the low boiling organic solvent is contained in addition to the high boiling organic solvent, it is preferred from the viewpoints of stability of the emulsified product and safety and health that the low boiling solvent is removed. As methods for removing the low boiling solvent, various known methods can be used depending on the type of solvent. That is to say, such methods include evaporation, vacuum evaporation and ultrafiltration. This process of removing the low boiling organic solvent is preferably conducted as soon as possible just after emulsification.

As a result of intensive studies, the present inventors have discovered that ejection quality in continuous printing is improved by preventing bubbles from being generated in ink jet printing and/or allowing the bubbles generated to disappear.

Accordingly, the ink for ink jet recording of the invention is characterized in that the ink has a bubble height of 30 mm or less when the ink has been shaken 30 times or more for 10 seconds and allowed to stand for 3 minutes, or a bubble height of 50 mm or less just after the ink has been shaken 30 times or more for 10 seconds. Preferably, the ink has a bubble height of 30 mm or less when the ink has been shaken 30 times or more for 10 seconds and allowed to stand for 3 minutes, and a bubble height of 50 mm or less just after the ink has been shaken 30 times or more for 10 seconds.

The bubble height after standing for 3 minutes is preferably 20 mm or less, and more preferably 15 mm or less.

Further, the bubble height just after shaking is preferably 40 mm or less, and more preferably 20 mm or less.

In the invention, there is no particular limitation on the means for preventing the bubbles from being generated in the ink and/or allowing the bubbles generated to disappear. However, it is preferred that an antifoaming agent described below is added, thereby preventing the bubbles from being generated and/or allowing the bubbles generated to disappear.

The term "antifoaming agent" as used in the invention means a compound itself existing on a liquid surface in place of a causative substance of foaming, and having no ability to give repulsive force resistant to thinning of a bubble film for itself. Specific examples thereof include alcohols, ethers, fatty acid esters, metal soaps, phosphates, silicones and nonionic surfactants.

The alcohols include, for example, methanol, ethanol, butanol and octanol.

The fatty acid esters include, for example, isoamyl stearate, diester succinate, diethylene glycol distearate and oxyethylene sorbitan monolaurate. As a commercial product, for example, Nopco KF manufactured by Nopco Chem. Co. is available.

The ethers include, for example, di-t-amylphenoxyethanol, 3-heptyl cellosolve, nonyl cellosolve and 3-heptylcarbitol, and commercial products thereof include, for example, Bionin K-17 manufactured by Takemoto Oil & Fat Co., Ltd. and Nopco DF122-NS manufactured by Sun Nopco Co., Ltd.

The metal soaps include, for example, aluminum stearate and potassium oleate, and commercial products thereof include, for example, Nopco DF122-NS manufactured by Sun Nopco Co., Ltd.

The silicones include, for example, a silicone oil, a silicone emulsion and organic modified silicone oil, and commercial products thereof include, for example, SN Defoamer 5016 manufactured by Sun Nopco Co., Ltd., Surfynol DF-58 and Surfynol DF-695 manufactured by Air Products Co., Ltd., and SM-5513 manufactured by Dow Corning Toray Silicone Co., Ltd.

The nonionic surfactants include the following examples:

(1) Alkyl allyl ether ethylene oxide addition product;
(2) HO—$(C_2H_4O)_n$—$(C_3H_6O)_m$—$(C_2H_4O)_n$—OH having a molecular weight of 500 to 10,000 and a $C_2H_4O$ content of 0% to 55%;
(3) Alkyl ester type: $R_1(R_2)CHCOO(C_2H_4O)_n$, wherein $R_1$ and $R_2$ each represents an alkyl group having 1 to 10 carbon atoms, and n is from 1 to 8; and
(4) Acetylenediol and its addition product to which 0 to 8 moles of ethylene oxide is added.

Of these, the silicones and the nonionic surfactants are preferred as the antifoaming agents used in the invention, and the nonionic surfactants having an HLB value of about 1 to about 4 are particularly preferred among others.

The antifoaming agents described above can be used either alone or as a combination of two or more of them.

The amount of the antifoaming agent added to the ink is preferably from 0.001% to 5% by weight, and more preferably from 0.01% to 3% by weight. When the amount added is too small, the antifoaming effect is not sufficiently produced. On the other hand, when the amount added is too large, layer separation unfavorably occurs in the ink solution.

In addition to the above-mentioned antifoaming agent, additives such as an anti-drying agent for preventing clogging caused by drying of the ink in jet nozzles, a permeation accelerator for allowing the ink to better permeate in paper, an ultraviolet absorber, an antioxidant, a viscosity modifier, a dispersing agent, a fungicide, a corrosion inhibitor, a pH adjusting agent and a chelating agent can be accordingly selected to use them in suitable amounts in the ink for ink jet recording obtained in the invention.

As the anti-drying agent used in the invention, a water-soluble organic solvent having a vapor pressure lower than that of water is preferred. Specific examples thereof include a polyhydric alcohol represented by ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerol or trimethylolpropane; a lower alkyl ether of a polyhydric alcohol such as iethyleneglycolmonomethyl (or monoethyl) ether, diethylene glycol monomethyl (or monoethyl) ether or triethylene glycol monoethyl (or monobutyl) ether; a heterocycle such as 2-pyrrolidone, N-methyl-2-pyrrolidone, 1,3-dimethyl-2-imidazolidinone or N-ethylmorpholine; a sulfur-containing compound such as sulfolane, dimethyl sulfoxide or 3-sulfolene; a multifunctional compound such as diacetone alcohol or diethanolamine; and a urea derivative. Of these, the polyhydric alcohol such as glycerol or diethylene glycol is more preferred. The above-mentioned anti-drying agents may be used either alone or as a combination of two or more of them. These anti-drying agents are each preferably contained in the ink in an amount of 10% to 50% by weight.

As the permeation accelerator, there can be used an alcohol such as ethanol, isopropanol, butanol, di(tri)ethylene glycol monobutyl ether or 1,2-hexanediol; sodium lauryl sulfate; sodium oleate; or a nonionic surfactant. When these are each contained in the ink in an amount of 10% to 30% by weight, the effect is sufficiently achieved. It is therefore preferred that these are each used within the range of the amount added in which no blotting of print and no print through occur.

As the ultraviolet absorbers used for improving image keeping quality in the invention, there can be used benzotriazole compounds described in JP-A-58-185677, JP-A-61-190537, JP-A-2-782, JP-A-5-197075 and JP-A-9-34057, benzophenone compounds described in JP-A-46-2784, JP-A-5-194483 and U.S. Pat. No. 3,214,463, cinnamic acid compounds described in JP-B-48-30492 (the term "JP-B" as used herein means an "examined Japanese patent publication"), JP-B-56-21141 and JP-A-10-88106, triazine compounds described in JP-A-4-298503, JP-A-8-53427, JP-A-8-239368, JP-A-10-182621 and JP-T-8-501291 (the term "JP-T" as used herein means a "published Japanese translation of a PCT patent application"), compounds described in *Research Disclosure* No. 24239 and compounds absorbing ultraviolet rays and emitting fluorescence represented by silylene and benzoxazole compounds, so-called fluorescent brightening agents.

In the invention, as the antioxidants used for improving image keeping quality, various organic and metal complex antifading agents can be used. The organic antifading agents include a hydroquinone, an alkoxyphenol, a dialkoxyphenol, a phenol, an aniline, an amine, an indane, a chroman, an alkoxylaniline and a heterocycle, and the metal complex antifading agents include a nickel complex and a zinc complex. More specifically, there can be used compounds described in patents cited in *Research Disclosure* No. 17643, VII, paragraphs I and J, ibid. No. 15162, ibid. No. 18716, page 650, left column, ibid. No. 36544, page 527, ibid. No. 307105, page 872 and ibid. No. 15162, and compounds included in general formulas of typical compounds and compound examples described in JP-A-62-215272, pages 127 to 137.

The preservatives used in the invention include sodium dehydroacetate, sodium benzoate, sodium pyridinethione-1-oxide, ethyl p-hydroxybenzoate, 1,2-benzisothiazoline-3-one and a salt thereof. These are each preferably used in the ink in an amount of 0.02% to 5.00% by weight.

Details of these are described in Bokin Bobai-zai Jiten (Cyclopedia of Microbicides and Fungicides) edited by Nippon Bokin Bobai Gakkai Jiten Henshu Iinkai (Cyclopedia Editorial Committee of Japan Antimicobe and Antifungus Society).

Further, the corrosion inhibitors include, for example, an acid sulfite, sodium thiosulfate, ammonium glycolate, diisopropylammonium nitrite, pentaerythritol tetranitrate, dicyclohexylammonium nitrite and benzotriazole. These are each preferably used in the ink in an amount of 0.02% to 5.00% by weight.

The pH adjusting agent used in the invention can be suitably used in terms of pH adjustment and dispersion stability, and it is preferred that the pH of the ink at 25° C. is adjusted to 8 to 11. A pH of less than 8 results in a decrease in solubility of the dye, which is liable to cause nozzles to be clogged. On the other hand, exceeding 11 results in a tendency of water resistance to deteriorate. The pH adjusting agents include an organic base and an inorganic alkali as basic agents, and an organic acid and an inorganic acid as acidic agents.

As the basic compound, there can also be used an inorganic compound such as sodium hydroxide, potassium hydroxide, sodium carbonate, potassium carbonate, sodium hydrogen carbonate, potassium hydrogen carbonate, sodium acetate, potassium acetate, sodium phosphate or sodium monohydrogenphosphate, or an organic base such as aqueous ammonia, methylamine, ethylamine, diethylamine, triethylamine, ethanolamine, diethanolamine, triethanolamine, ethylenediamine, piperidine, diazabicyclooctane, diazabicycloundecene, pyridine, quinoline, picoline, lutidine or collidine.

As the acidic compound, there can also be used an inorganic compound such as hydrochloric acid, sulfuric acid, phosphoric acid, boric acid, sodium hydrogen sulfate, potassium hydrogen sulfate, potassium dihydrogenphosphate or sodium dihydrogenphosphate, or an organic compound such as acetic acid, tartaric acid, benzoic acid, trifluoroacetic acid, methanesulfonic acid, ethanesulfonic acid, benzenesulfonic acid, p-toluenesulfonic acid, saccharic acid, phthalic acid, picolinic acid or quinolinic acid.

The conductivity of the ink of the invention is within the range of 0.01 to 10 S/m, and preferably within the range of 0.05 to 5 S/m.

The conductivity is measurable by the electrode method using commercially available saturated potassium chloride.

The conductivity is controllable mainly by the ion concentration in an aqueous solution. When the salt concentration is high, desalting can be conducted with an ultrafilter membrane. Further, when the conductivity is adjusted by adding salts, it can be adjusted by adding various organic salts or inorganic salts.

The inorganic salts include an inorganic compound such as a potassium halide, a sodium halide, sodium sulfate, potassium sulfate, sodium hydrogen sulfate, potassium hydrogen sulfate, sodium nitrate, potassium nitrate, sodium hydrogen carbonate, potassium hydrogen carbonate, sodium phosphate, sodium monohydrogenphosphate, boric acid, potassium dihydrogenphosphate or sodium dihydrogenphosphate. An organic compound such as sodium acetate, potassium acetate, potassium tartrate, sodium tartrate, sodium benzoate, potassium benzoate, sodium p-toluenesulfonate, potassium saccharate, potassium phthalate or sodium picolinate can also be used.

Further, the conductivity is also adjustable by selecting a component of an aqueous medium described later.

The viscosity of the ink of the invention is preferably from 1 to 30 mPa·S, more preferably from 2 to 15 mPa·S, and particularly preferably from 2 to 10 mPa·S, at 25° C. Exceeding 30 mPa·S results in a slow fixing rate of a recorded image and deterioration of ejection performance, whereas less than 1 mPa·S results in blotting of a recorded image to lower a quality level.

The viscosity of the ink is arbitrarily adjustable by the amount of an ink solvent added. The ink solvents include, for example, glycerol, diethylene glycol, triethanolamine, 2-pyrrolidone, diethylene glycol monobutyl ether and triethylene glycol monobutyl ether.

Further, the viscosity modifier may also be used. The viscosity modifiers include, for example, a cellulose, a water-soluble polymer such as polyvinyl alcohol, and a nonionic surfactant. They are described in *Viscosity Controlling Technology*, Chapter 9, Gijutsu Joho Kyokai (Technical Information association) (1999), and *Chemicals for Ink Jet Printers* (supplemented in 1998), Survey of Development Trend-Outlook of Materials, pages 162 to 174, CMC (1997), in more detail.

Although a method for measuring the viscosity of a liquid is described in JIS Z8803 in detail, the viscosity can be easily measured with a commercially available viscometer. Rotary viscometers include, for example, a B type viscometer and an E type viscometer manufactured by Tokyo Keiki Co., Ltd. In the invention, the viscosity was measured at 25° C. with a vibratory VM-100A-L type viscometer manufactured by Yamaichi Denki. Although the unit of the viscosity is the pascal·second (Pa·S), the millipascal·second (mPa·S) is usually used.

The surface tension of the ink used in the invention is preferably from 20 to 50 mN/m, and more preferably from 20 to 40 mN/m, at 25° C. in both the dynamic surface tension and the static surface tension. When the surface tension exceeds 50 mN/m, ejection stability is decreased, and blotting in color mixing and smeared print edges occur to significantly deteriorate print quality. On the other hand, when the surface tension of the ink is less than 20 mN/m, the ink adheres to a surface of hardware to cause poor print in some cases.

In order to adjust the surface tension, various cationic, anionic and nonionic surfactants can be added. The surfactants are each used preferably in an amount ranging from 0.01% to 20% by weight, and more preferably in an amount ranging from 0.1% to 10% by weight, based on the ink for ink jet. The surfactants can be used as a combination of two or more of them.

As methods for measuring the static surface tension, there have been known a capillary rise method, a dropping method and a hanging ring method. However, in the invention, the static surface tension is measured by a vertical plate method.

When a thin glass or platinum plate is vertically hung with part thereof immersed in a liquid, the surface tension of the liquid acts downward along a length at which the liquid is in contact with the plate. The surface tension can be measured by bringing this tension into balance with an upward force.

Further, as methods for measuring the dynamic surface tension, there have been known a vibrating jet method, a meniscus dropping method and a maximum bubble pressure method, as described, for example, in *Shin Jikken Kagaku Koza* (New Experimental Chemistry Course), vol. 18, Interface and Colloid, pages 69 to 90, Maruzen Co., Ltd. (1977). Further, there has been known a liquid film destruction method as described in JP-A-3-2064. However, in the invention, the dynamic surface tension is measured by a bubble pressure difference method. A measurement principle and procedure thereof will be described below.

When a bubble is formed in a solution homogenized by stirring, a new gas-liquid interface is formed, and surfactant molecules in the solution gather on a surface of water at a constant rate. When the bubble rate (the formation rate of the bubble) is changed, the formation rate slowed down causes more surfactant molecules to gather on a surface of the bubble. Accordingly, the maximum bubble pressure just before the bubble bursts is lowered, and the maximum bubble pressure (surface tension) to the bubble rate can be detected. Preferred examples of the methods for measuring the dynamic surface tension include a method of forming a bubble in a solution using two large and small probes, measuring the differential pressure at the maximum bubble pressure state of the two probes, and calculating the dynamic surface tension.

In respect to ejection stability of the ink, print image quality, various fastness properties of an image, and reductions in blotting of an image after printing and stickiness of a printed surface, it is preferred that nonvolatile ingredients are contained in the ink of the invention in an amount of 10% to 70% by weight based on the total amount of the ink. Further, in respect to ejection stability of the ink and a reduction in blotting of an image after printing, it is more preferred that the nonvolatile ingredients are contained in an amount of 20% to 60% by weight.

The term "nonvolatile ingredients" means liquid and solid ingredients and high molecular weight ingredients having a boiling point of 150° C. or more at 1 atm. The nonvolatile ingredients contained in the ink for ink jet include a dye, a high boiling solvent, and a polymer latex, a surfactant, a dye stabilizer, a fungicide and a buffer which are added as needed. Many of these nonvolatile ingredients, except for the dye stabilizer, decrease the dispersion stability of the ink. Further, they exist on ink jet image-receiving paper even after printing, so that stabilization by association of the dye on the image-receiving paper is inhibited to deteriorate various fastness properties of an image area and blotting of an image under conditions of high humidity.

In the invention, it is also possible to contain a high molecular weight compound. The term "high molecular weight compound" as used herein means all high-molecular compounds having a number average molecular weight of 5,000 or more contained in the ink. These high-molecular compounds include a water-soluble high-molecular compound substantially soluble in an aqueous medium, a water-dispersible high-molecular compound such as a polymer latex or a polymer emulsion, and an alcohol-soluble high-molecular compound soluble in a polyhydric alcohol used as a co-solvent. The high molecular weight compounds used in the invention include any compounds as long as they are substantially homogeneously soluble or dispersible in the ink solution.

Specific examples of the water-soluble high-molecular compounds include water-soluble polymers such as polyvinyl alcohol, silanol-modified polyvinyl alcohol, carboxymethyl cellulose, hydroxyethyl cellulose, polyvinylpyrrolidone, a polyalkylene oxide such as polyethylene oxide or polypropylene oxide, and a polyalkylene oxide derivative; natural water-soluble polymers such as a polysaccharide, starch, cationized starch, casein and gelatin; aqueous acrylic resins such as polyacrylic acid, polyacrylamide and copolymers of them; aqueous alkyd resins; and water-soluble high-molecular compounds each having an $—SO_3^-$ group or a $—COO^-$ group in its molecule and substantially soluble in an aqueous medium.

The polymer latexes include a styrene-butadiene latex, a styrene-acrylic latex and a polyurethane latex. Further, the polymer emulsions include an acrylic emulsion.

These water-soluble high-molecular compounds can be used either alone or as a combination of two or more of them.

As already described, the water-soluble high-molecular compound is used as the viscosity modifier in order to adjust the viscosity of the ink to a viscosity region in which ejection characteristics are good. However, when the amount thereof added is too large, the viscosity of the ink is increased to lower the ejection stability of the ink solution. As a result, the nozzles are liable to be clogged with a precipitate formed in the ink with time.

The amount of the high-molecular compound added as the viscosity modifier is from 0% to 5% by weight, preferably from 0% to 3% by weight, and more preferably from 0% to 1% by weight, based on the total amount of the ink, although it depends on the molecular weight of the compound to be added (the higher molecular weight requires the smaller amount of the compound added).

In the invention, apart from the above-mentioned surfactants, surface tension adjusters can be used. Examples thereof include nonionic, cationic and anionic surfactants. For example, the anionic surfactants include a fatty acid salt, an alkylsulfate, an alkylbenzenesulfonate, an alkylnaphthalenesulfonate, a dialkylsulfosuccinate, an alkylphosphate, a naphthalenesulfonic acid-formalin condensation product and a polyoxyethylenealkylsulfate. The nonionic surfactants include a polyoxyethylene alkyl ether, a polyoxyethylene alkyl allyl ether, a polyoxyethylene fatty acid ester, a sorbitan fatty acid ester, a polyoxyethylene sorbitan fatty acid ester, a polyoxyethylenealkylamine, a glycerol fatty acid ester and an oxyethylene-oxypropylene block copolymer. SURFYNOLS (Air Products & Chemicals), acetylenic polyoxyethylene oxide surfactants, are also preferably used. Further, amine oxide type amphoteric surfactants such as an N,N-dimethyl-N-alkylamine oxide are also preferred. Furthermore, surfactants described in JP-A-59-157636, pages 37 and 38, and *Research Disclosure* No. 308119 (1989) can also be used.

In the invention, the various cationic, anionic and nonionic surfactants described above can be used as the dispersing agents and dispersion stabilizers, and fluorine or silicone compounds or chelating agents represented by EDTA can also be used as the antifoaming agents, as needed.

Recording paper and recording film used in the invention will be described below. A support of the recording paper or the recording film is made of chemical pulp such as LBKP or NBKP, mechanical pulp such as GP, PGW, RMP, TMP, CTMP, CMP or CGP, or used paper pulp such as DIP, to which various known additives such as a pigment, a binder, a sizing agent, a fixing agent, a cationic agent and a paper strong agent are added, and manufactured with various machines such as a wire paper machine and a cylinder paper machine. Besides these supports, any of synthetic paper and a plastic film sheet may be used as the support. The thickness of the support is desirably from 10 to 250 μm, and the basis weight thereof is desirably from 10 to 250 g/m².

The support may be provided with an image-receiving layer and a back coat layer as such to form an image-receiving material of the invention, or may be provided with size press coatings or anchor coat layers on both sides thereof using starch or polyvinyl alcohol, and then provided with an image-receiving layer and a back coat layer to form an image-receiving material. Further, the support may be subjected to flattening treatment using a calendering apparatus such as a machine calender, a TG calender or a soft calender.

In the invention, as the support, there is more preferably used paper or plastic film both sides of which are laminated with a polyolefin (for example, polyethylene, polystyrene, polybutene or copolymers of them) or polyethylene terephthalate. A white pigment (for example titanium oxide or zinc oxide) or a toning dye (for example, cobalt blue, ultramarine blue or neodymium oxide) is preferably added to the polyolefin.

The image-receiving layer provided on the support contains a porous material and an aqueous binder. Further, it is preferred that the image-receiving layer contains a pigment, and as the pigment, preferred is a white pigment. The white pigments include white inorganic pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as a styrenic pigment, an acrylic pigment, a urea resin and a melamine resin. Particularly preferred is a porous white inorganic pigment, and synthetic amorphous silica having a large pore area is particularly suitable. As the synthetic amorphous silica, there are available both silicic anhydride obtained by the dry manufacturing process (vapor phase process) and hydrated silicic acid obtained by the wet manufacturing process.

As the recording paper containing the above-mentioned pigment in the image-receiving layer, specifically, there can be used paper disclosed in JP-A-10-81064, JP-A-10-119423, JP-A-10-157277, JP-A-10-217601, JP-A-11-348409, JP-A-2001-138621, 2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, JP-A-8-2093, JP-A-8-174992, JP-A-11-192777 and JP-A-2001-301314.

The aqueous binders contained in the image-receiving layer include water-soluble polymers such as polyvinyl alcohol, silanol-modified polyvinyl alcohol, starch, cationized starch, casein, gelatin, carboxymethyl cellulose, hydroxyethyl cellulose, polyvinylpyrrolidone, a polyalkylene oxide and a polyalkylene oxide derivative, and water-dispersible polymers such as a styrene-butadiene latex and an acrylic latex. These aqueous binders can be used either alone or as a combination of two or more of them. In the invention, of these, polyvinyl alcohol and silanol-modified polyvinyl alcohol are particularly suitable in respect to adhesion properties to the pigment and separation resistance of the ink-receiving layer.

The image-receiving layer can contain a mordant, a water resistance-imparting agent, a light resistance improver, a gas resistance improver, a surfactant, a hardener and other additives, as well as the pigment and the aqueous binder.

It is preferred that the mordant added to the image-receiving layer is immobilized. For that purpose, a polymer mordant is preferably used.

The polymer mordants are described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60643, JP-A-60-118834, JP-A-60-122940, JP-A-60-122941, JP-A-60-122942, JP-A-60-235134, JP-A-1-161236, and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing a polymer mordant described in JP-A-1-16123, pages 212 to 215 is particularly preferred. The use of the polymer mordant described in JP-A-1-16123 provides an image having excellent image quality, and improves the light resistance of the image.

The water resistance-imparting agent is effective for imparting water resistance to an image, and as the water resistance-imparting agent, a cationic resin is particularly desirable. Such cationic resins include polyamidepolyamine epichlorohydrin, polyethyleneimine, polyaminesulfone, dimethyldiallylammonium chloride polymer and cationic polyacrylamide. The content of these cationic resins is preferably from 1% to 15% by weight, and particularly preferably from 3% to 10% by weight, based on the total solid content of the ink-receiving layer.

The light resistance improvers and gas resistance improvers include a phenol compound, a hindered phenol compound, a thioether compound, a thiourea compound, a thiocyanic acid compound, an amine compound, a hindered amine compound, a TEMPO compound, a hydrazine compound, a hydrazide compound, an amidine compound, a vinyl group-containing compound, an ester compound, an amide compound, an ether compound, an alcohol compound, a sulfinic acid compound, a saccharide, a water-soluble reducing compound, an organic acid, an inorganic acid, a hydroxyl group-containing compound, a benzotriazole compound, a benzophenone compound, a triazine compound, a heterocyclic compound, a water-soluble metal salt, an organic metal compound and a metal complex.

Specific examples of these compounds include compounds described in JP-A-10-182621, JP-A-2001-260519, JP-A-2000-260519, JP-B-4-34953, JP-B-4-34513, JP-B-4-34512, JP-A-11-170686, JP-A-60-67190, JP-A-7-276808, JP-A-2000-94829, JP-T-8-512258 and JP-A-11-321090.

The surfactant acts as a coating aid, a separation improver, a slippage improver or an antistatic agent. The surfactants are described in JP-A-62-173463 and JP-A-62-183457.

In pace of the surfactant, an organic fluoro compound may be used. It is preferred that the organic fluoro compound is hydrophobic. Examples of the organic fluoro compounds include a fluorine surfactant, an oily fluorine compound (for example, fluorine oil) and a solid fluorine compound (for example, a ethylene tetrafluoride resin). The organic fluoro compounds are described in JP-B-57-9053 (columns 8 to 17), JP-A-61-20994 and JP-A-62-135826.

As the hardeners, there can be used materials described in JP-A-1-161236, page 222, JP-A-9-263036, JP-A-10-119423 and JP-A-2001-310547.

Other additives added to the image-receiving layer include a pigment dispersing agent, a viscosity improver, an antifoaming agent, a dye, a fluorescent brightening agent, a preservative, a pH adjusting agent, a matte agent and a hardener. The ink-receiving layer may be composed of either one layer or two layers.

The recording paper and recording film can each be provided with a back coat layer. Components addible to this layer include a white pigment, an aqueous binder and other components.

The white pigments contained in the back coat layer include, for example, white inorganic pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrous halloysite, magnesium carbonate and magnesium hydroxide, and organic pigments such as a styrenic plastic pigment, an acrylic plastic pigment, polyethylene, microcapsules, a urea resin and a melamine resin.

The aqueous binders contained in the back coat layer include water-soluble polymers such as a styrene-maleate copolymer, a styrene-acrylate copolymer, polyvinyl alcohol, silanol-modified polyvinyl alcohol, starch, cationized starch, casein, gelatin, carboxymethyl cellulose, hydroxyethyl cellulose and polyvinylpyrrolidone, and water-dispersible polymers such as a styrene-butadiene latex and an acrylic latex. The other components contained in the back coat layer include an antifoaming agent, a foam inhibitor, a dye, a fluorescent brightening agent, a preservative and a water resistance-imparting agent.

A fine polymer particle dispersion may be added to layers (including a back layer) constituting the ink jet recording paper or recording film. The fine polymer particle dispersion is used for improvements in film properties such as dimensional stabilization, curl prevention, adhesion prevention and film crack prevention. The fine polymer particle dispersions are described in JP-A-62-245258, JP-A-62-136648 and JP-A-62-110066. When the dispersion of fine polymer particles having a low glass transition temperature (of 40° C. or less) is added to a mordant-containing layer, crazing of the layer and curling can be prevented. Also when the dispersion of fine polymer particles having a high glass transition temperature is added to the back layer, curling can be prevented.

There is no limitation on the ink jet recording system applied to the ink of the invention. The ink of the invention is used in known systems such as a charge control system in which the ink is ejected by electrostatic induction force, a drop-on-demand system (pressure pulse system) utilizing oscillation pressure of piezoelectric elements, an acoustic ink jet system in which electric signals are converted to acoustic beams, with which the ink is irradiated to eject the ink by the use of radiation pressure, and a thermal ink jet system (bubble jet system) in which the ink is heated to form bubbles, and pressure generated is utilized.

The ink jet recording systems include a system of ejecting an ink low in concentration, which is called photo ink, as many drops small in volume, a system of improving image quality using a plurality of inks substantially identical in hues and different in concentration, and a system of using a transparent and colorless ink.

The ink for ink jet recording of the invention can also be used for applications other than ink jet recording. For example, the ink of the invention can be used in a display image material, an image formation material for an interior decoration material and an image formation material for an outdoor decoration material.

The display image material indicates various materials such as a poster, wallpaper, an ornamental article (such as an ornament or a doll), a leaflet for commercial advertisement, package paper, a wrapping material, a paper bag, a plastic bag, a package material, a signboard, an image drawn on or attached to a side panel of a public transport (such as an automobile, a bus or a train) and a suit with a logo. When the dye of the invention is used as the material for forming the display image, the image means all human-recognizable patterns formed by the dye, such as an abstract design, a letter and a geometrical pattern, as well as an image in a narrow sense.

The interior decoration material indicates various materials such as wallpaper, an ornamental article (such as an ornament or a doll), a member of a lighting apparatus, a member of furniture and a design member of a floor or a ceiling. When the dye of the invention is used as the image formation material, the image means all human-recognizable patterns formed by the dye, such as an abstract design, a letter and a geometrical pattern, as well as an image in a narrow sense.

The outdoor decoration material indicates various materials such as a wall material, a roofing material, a signboard, a gardening material, an outdoor ornamental article (such as an ornament or a doll) and a member of an outdoor lighting apparatus. When the dye of the invention is used as the image formation material, the image means all human-recognizable patterns formed by the dye, such as an abstract design, a letter and a geometrical pattern, as well as an image in a narrow sense.

In the applications as described above, media on which the patterns are formed include various materials such as paper, fiber, cloth (including nonwoven fabric), plastics, metals and ceramics. Dying is carried out by mordanting or printing. Further, the dye can also be fixed in the form of a reactive group-introduced reactive dye. Of these, it is preferred that dying is carried out by mordanting.

In the production of the ink, it is also possible to apply sonic vibration in a process of dissolving additives such as the dye.

The sonic vibration is applied for removing bubbles by previously applying energy equivalent to or higher than that received at a recording head, during the manufacturing process, in order to prevent bubbles from being generated by pressure applied to the ink at the recording head.

The frequency of the sonic vibration is usually 20 kHz or more, preferably 40 kHz or more and more preferably 59 kHz or more. Further, the energy applied to the solution by the sonic vibration is usually $2 \times 10^7$ J/m$^3$ or more, preferably $5 \times 10^7$ J/m$^3$ or more, and more preferably $1 \times 10^8$ J/m$^3$ or more. The sonic vibration is usually applied for 10 minutes to 1 hour.

The effect can be achieved whenever the sonic vibration is applied, as long as it is done after the dye has been added to the medium. However, it is preferred that the sonic vibration is applied in dissolving and/or dispersing the dye in the medium, because bubbles are more effectively removed, and the dissolution and/or dispersion of the dye in the medium is promoted by the sonic vibration.

That is to say, the above-mentioned process of applying at least the sonic vibration can be performed in either case, during or after the process of dissolving and/or dispersing the dye in the medium. In other words, the above-mentioned process of applying at least the sonic vibration can be performed once or more at will, until the ink becomes a product after the preparation of the ink.

As a mode for carrying out the invention, it is preferred that the process of dissolving and/or dispersing the dye in the medium comprises a process of dissolving the above-mentioned dye in part of the entire medium and a process of mixing the residual medium with the resulting solution. In at least either of the above-mentioned processes, the sonic vibration is preferably applied. It is more preferred that the sonic vibration is applied in at least the process of dissolving the dye in part of the entire medium.

The process of mixing the residual medium with the resulting solution may be either single or plural.

The use of heat deaeration or vacuum deaeration in the production of the ink according to the invention is preferred, because the effect of removing bubbles in the ink is increased. It is preferred that the heat deaeration or vacuum deaeration is conducted concurrently with or after the process of mixing the residual medium.

Means for generating the sonic vibration include known apparatus such as an ultrasonic disperser.

In preparing the ink of the invention, solid foreign matter is removed by filtration after solution preparation. This process is important. A filter is used in this operation. In this case, the filter having an effective diameter of 1 μm or less, preferably 0.05 to 0.3 μm, particularly preferably 0.25 to 0.3 μm is used. As materials for the filter, various materials can be used. In particular, in the case of the ink of the water-soluble dye, a filter prepared for an aqueous solvent is preferably used. The use of a filter made of a polymer material, which is hard to produce dust, is preferred among others. In conducting filtration, the solution may be allowed to pass through the filter by solution supply, and either of pressure filtration and filtration under reduced pressure is available.

After this filtration, air is often incorporated into the solution. Bubbles resulting from this air also contribute to the distortion of an image in ink jet recording in many cases. It is therefore preferred that the above-mentioned defoaming process is separately provided. As the defoaming methods, the solution after the filtration may be allowed to stand, and various methods such as ultrasonic defoaming and defoaming under reduced pressure using commercially available apparatus are available. In the case of the ultrasonic defoaming, a defoaming procedure is performed preferably for 30 seconds to 2 hours, more preferably for 5 minutes to 1 hour.

These operations are preferably done through the use of a space such as a clean room or a clean bench, in order to prevent contamination with dust in the operations. In the invention, it is particularly preferred that the operations are done in the space of class 1000 or less as the degree of cleanness. The term "the degree of cleanness" as used herein indicates a value measured with a dust counter.

The volume of the ink drop ejected onto a recording material in the invention is from 0.1 pl to 100 pl. The volume of the ejected ink drop is preferably within the range of 0.5 pl to 50 pl, and particularly preferably within the range of 2 pl to 50 pl.

In the invention, there is no limitation on the ink jet recording system. The ink of the invention is used in known systems such as a charge control system in which the ink is ejected by electrostatic induction force, a drop-on-demand system (pressure pulse system) utilizing oscillation pressure of piezoelectric elements, an acoustic ink jet system in which electric signals are converted to acoustic beams, with which the ink is irradiated to eject the ink by the use of radiation pressure, and a thermal ink jet system (bubble jet system) in which the ink is heated to form bubbles, and pressure generated is utilized.

The ink jet recording systems include a system of ejecting an ink low in concentration, which is called photo ink, as many drops small in volume, a system of improving image quality using a plurality of inks substantially identical in hues and different in concentration, and a system of using a transparent and colorless ink. The volume of the ejected ink drop is controlled mainly with a print head.

For example, in the case of the thermal ink jet system, it is possible to control the volume of the ejected ink drop by the structure of the print head. That is to say, the ink drop having a desired size can be ejected by changing the size of an ink chamber, a heating unit or a nozzle. Even in the case of the thermal ink jet system, it is also possible to realize ejection of the plural ink drops different in size by providing a plurality of heads having heating units or nozzles different in size.

In the case of the drop-on-demand system using piezoelectric elements, the volume of the ejected ink drop can also be changed by the structure of the print head similarly to the thermal ink jet system. However, the plural ink drops different in size can be ejected using the print head of the same structure by controlling the waveform of driving signals for driving the piezoelectric elements.

In the invention, the ejection frequency at the time when the ink drop is ejected onto the recording material is 1 KHz or more.

In order to record a high-quality image like a photograph, the image high in sharpness is reproduced with small ink drops. It is therefore required that the ink drop ejection density is 600 dpi (dots pre inch).

On the other hand, when the ink drops are ejected with heads each having a plurality of nozzles, there is a restriction that the number of heads concurrently drivable is from tens to about 200 for a type in which recording paper and the heads move in directions crossing at right angles to make recording, and hundreds even for a type in which the heads called line heads are fixed. The reason for this is that a number of heads can not be driven at the same time, because there is a restriction in driving electric power and heat generation in the heads has an influence on an image.

Here, it is possible to increase the recording speed by increasing the driving frequency.

In the case of the thermal ink jet system, the ink drop ejection frequency can be controlled by controlling the frequency of head driving signals for heating the heads.

In the case of the piezoelectric system, it can be controlled by controlling the frequency of signals for driving the piezoelectric elements.

Figure 2:
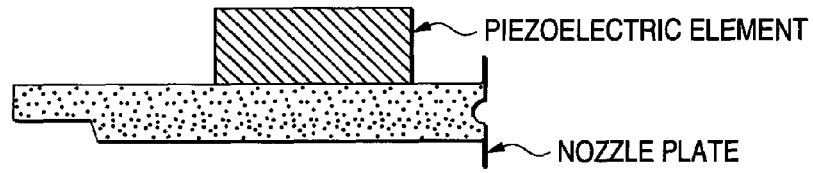
FIGS. 2(a) to 2(c) are views showing a state in which an ink drop is ejected by expansion of a piezoelectric element.
Figure 2:
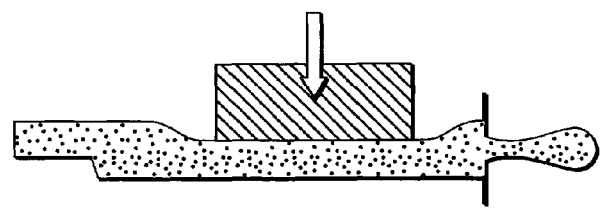
Figure 2:
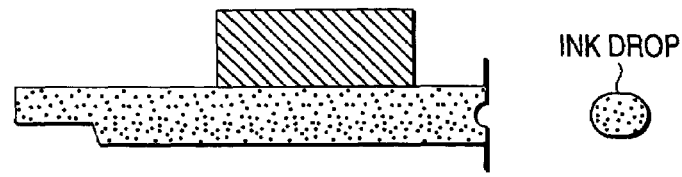

Driving of the piezoelectric head will be described below. As shown in FIG. 1, for an image signal to be printed, the ejected ink drop size, the ink drop ejection speed and the ink drop ejection frequency is determined with a printer control unit to form a signal for driving the print head. The driving signal is supplied to the print head. As shown in FIG. 2, the ejected ink drop size, the ink drop ejection speed and the ink drop ejection frequency are controlled by the signal for driving the piezoelectric element. Here, the ejected ink drop size and the ink drop ejection speed are determined by the shape and amplitude of the driving waveform, and the frequency is determined by the cycle period of the signal.

When the ink drop ejection frequency is set to 10 KHz, the head is driven every 100 microseconds, and recording of one line is terminated for 400 microseconds. Printing can be made at a speed of 1 sheet per 1.2 seconds by setting the moving speed of recording paper so as to move by 1/600 inch, namely about 42 micron meters, per 400 microseconds.

As the structure of the printing apparatus or the printer of the invention, for example, a mode as disclosed in JP-A-11-170527 is suitable. Further, as for an ink cartridge, one disclosed in JP-A-5-229133 is suitable. As for suction and the structure of a cap covering the print head in that case, those described in JP-A-7-276671 are suitable. Further, it is suitable that a filter for removing bubbles as disclosed in JP-A-9-277552 is provided in the vicinity of the head. Furthermore, water repellent treatment as described in Japanese Patent Application No. 2001-016738 is suitably conducted on a surface of the nozzle. The printer may be either a printer connected to a computer or an apparatus specialized to printing of photographs.

The ink jet recording process of the invention is characterized in that the average ink drop ejection speed at the time when the ink composition for ink jet recording comprising at least one dye represented by the above-mentioned general formula (1) which is dissolved or dispersed in the aqueous medium is ejected onto the recording material is 2 m/sec or more, and more preferably 5 m/sec or more.

The control of the ink drop ejection speed is performed by controlling the shape and amplitude of the waveform for driving the head.

The plural ink drops different in size can be ejected using the same print head by using properly the plurality of driving waveforms.

EXAMPLES

The invention will be illustrated with reference to the following examples, but the invention should not be construed as being limited thereto.

Example 1

Deionized water was added to the following components to bring the volume to 1 liter, followed by stirring for 1 hour with heating at 30 to 40° C. Then, the resulting solution was filtered through a microfilter having an average pore size of 0.25 μm under reduced pressure to prepare light magenta ink solution LM-101.

[Formulation of Light Magenta Ink LM-101]

(Solid Components)

| Magenta Dye (a-36) of the Invention | 7.5 g/l |
| Proxel | 3.5 g/l |

(Liquid Components)

| Diethylene Glycol (DEG) | 150 g/l |
| Glycerol (GR) | 130 g/l |
| Triethylene Glycol Monobutyl Ether (TGB) | 130 g/l |
| Triethanolamine (TEA) | 6.9 g/l |
| Surfynol STG (SW: Nonionic Surfactant) | 10 g/l |
| Exemplified Compound W-19 | 30 g/l |

Further, magenta ink solution M-101 was prepared in which the amount of magenta dye (a-36) in the above-mentioned formulation is increased to 23 g.

[Formulation of Magenta Ink M-101]

(Solid Components)

| Magenta Dye (a-36) of the Invention | 23 g/l |
| Proxel | 3.5 g/l |

(Liquid Components)

| Diethylene Glycol | 150 g/l |
| Glycerol | 130 g/l |
| Triethylene Glycol Monobutyl Ether | 130 g/l |
| Triethanolamine | 6.9 g/l |
| Surfynol STG | 10 g/l |
| Exemplified Compound W-19 | 30 g/l |

Inks were prepared which had the same compositions as LM-101 and M-101, respectively, with the exception that additives were added as described in Table 14 described below.

TABLE 14

| | Additive | Height of Bubble (Just after/after 3 min) | |
|---|---|---|---|
| LM-101, M-101 | Not added | 75/60 mm | Comparative Example |
| LM-102, M-102 | 2 g/l of compound A1 | 10/7 mm | Example 1 |
| LM-103, M-103 | 3 g/l of compound A2 | 12/7 mm | Example 2 |

Compound A1: $C_4H_9(C_4H_9)CCOO(C_2H_4O)_4OH$
Compound A2: A 4-mole ethylene oxide adduct of 2,4,7,9,-tetramethyl-5-decine-4,7-diol These inks were each loaded in a magenta ink/light magenta ink cartridge of an ink jet printer (PM-950C, manufactured by Seiko Epson Corporation), and the inks of PM-950C were used as the other color inks. Thus, monochromatic images of magenta were printed. The images were printed on ink jet paper, photo-gloss paper EX manufactured by Fuji Photo Film Co., Ltd., as image receiving sheets, and the ejection quality of the inks was evaluated.

(Evaluation Tests)

(1) Three grams of each ink was taken in a test tube 15 mm in diameter and 10 cm in length with a stopper, and violently shaken to observe the state of bubbles. Results thereof are shown in Table 15.

(2) Each ink was loaded in a magenta ink/light magenta ink cartridge of an ink jet printer (PM-920C, manufactured by Seiko Epson Corporation), and the inks of PM-920C were used as the other color inks. Thus, monochromatic images of magenta were printed. The images were continuously printed on ink jet paper, photo-gloss paper EX manufactured by Fuji Photo Film Co., Ltd. Results thereof are shown in Table 15.

TABLE 15

| | Evaluation of State of Continuous Printing |
|---|---|
| LM-101, M-101 (Comparative Example) | The failure of ejection occurred in some of the nozzles at the 25th print. |
| LM-102, M-102 (Example 1) LM-103, M-103 (Example 2) | The failure of ejection and the distortion of an image did not occur even at the 50th print |

The results of Table 15 indicate that the inks of the invention are more excellent in ejection quality than the inks of Comparative Example.

The ink of the invention is excellent in ejection quality, and the failure of ejection does not occur even in continuous printing. According to the invention, therefore, there can be provided the ink for ink jet recording useful for making prints on paper, films, cloth and so on.

The entire disclosure of each and every foreign patent application from which the benefit of foreign priority has been claimed in the present application is incorporated herein by reference, as if fully set forth.

What is claimed is:

1. An ink for ink jet recording comprising:
    at least one dye represented by the following general formula (1), in which the at least one dye is dissolved or dispersed in an aqueous medium; and
    a betaine surfactant,
    wherein, when the ink has been shaken 30 times or more for 10 seconds and allowed to stand for 3 minutes, a bubble height in the ink is 30 mm or less:

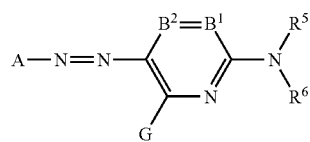

wherein A represents a five-membered heterocyclic group; $B^1$ and $B^2$ each represents =N—, =CR$^1$— or —CR$^2$=, and when one thereof represents =N—, the other represents =CR$^1$— or —CR$^2$=; $R^5$ and $R^6$ each independently represents a hydrogen atom or a substituent group, wherein the substituent group represents an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and a hydrogen atom of each substituent group may be substituted; G, $R^1$ and $R^2$ each independently represents a hydrogen atom or a substituent group, wherein the substituent group represents a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and a hydrogen atom of each substituent group may be substituted; and $R^1$ and $R^5$, or $R^5$ and $R^6$ may combine with each other to form a five- or six-membered ring.

2. An ink for ink jet recording comprising:
    at least one dye represented by the following general formula (1), in which the at least dye is dissolved or dispersed in an aqueous medium; and
    a betaine surfactant,
    wherein a bubble height in the ink just after the ink has been shaken 30 times or more for 10 seconds, is 50 mm or less:

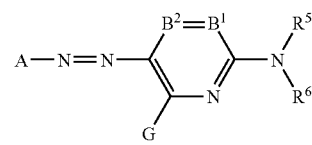

wherein A represents a five-membered heterocyclic group; $B^1$ and $B^2$ each represents =N—, =CR$^1$— or —CR$^2$=, and when one thereof represents =N—, the other represents =CR$^1$— or —CR$^2$=; $R^5$ and $R^6$ each independently represents a hydrogen atom or a substituent group, wherein the substituent group represents an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and a hydrogen atom of each substituent group may be substituted; G, $R^1$ and $R^2$ each independently represents a hydrogen atom or a substituent group, wherein the substituent group represents a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and a hydrogen atom of each substituent group may be substituted; and $R^1$ and $R^5$, or $R^5$ and $R^6$ may combine with each other to form a five- or six-membered ring.

3. The ink for ink jet recording according to claim 1 or 2, wherein A in the formula (1) represents a pyrazole ring, an imidazole ring, a thiazole ring, an isothiazole ring, a thiadiazole ring, a benzothiazole ring, a benzoxazole ring or a benzoisothiazole ring, each of which may have a substituent group.

4. The ink for ink jet recording according to claim 1 or 2, wherein A in the formula (1) is a pyrazole ring, an imidazole ring, an isothiazole ring, a thiadiazole ring or a benzothiazole ring, represented by the following general formulae (a) to (f):

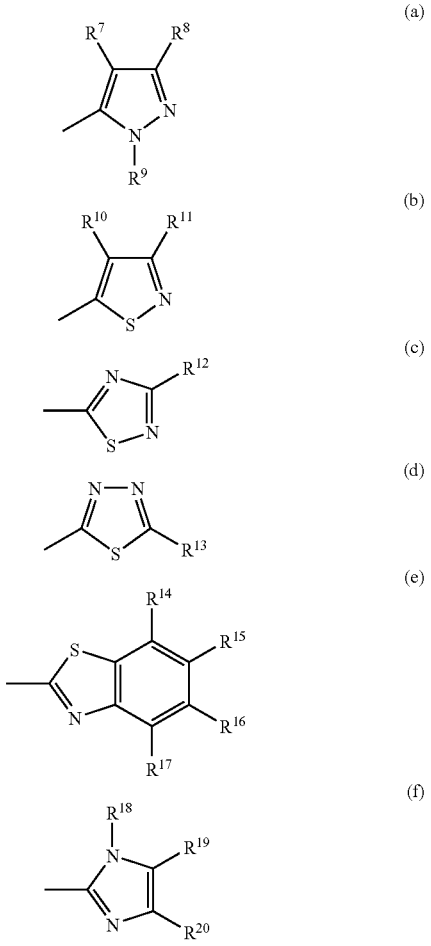

wherein $R^7$ to $R^{20}$ each has the same definition as with G, $R^1$ and $R^2$ in the general formula (1).

5. The ink for ink jet recording according to claim 1 or 2, wherein, when the dye represented by the formula (1) is a water-soluble dye, the dye represented by the formula (1) further has an ionic hydrophilic group as a substituent group at any position of $R^1$, $R^2$, $R^5$, $R^6$ and G, and the ionic hydrophilic groups is at least one of a sulfo group, a carboxyl group, a phosphono group and a quaternary ammonium group.

6. The ink for ink jet recording according to claim 1 or 2, wherein the betaine surfactant is a compound having both a cationic site and an anionic site in its molecule and having surface activity, in which the cationic sites include at least one of a nitrogen atom of an amine, a nitrogen atom of a heteroaromatic ring, a phosphorus atom and a boron atom having four bonds with carbon.

7. The ink for ink jet recording according to claim 1 or 2, which comprises the betaine surfactant in an amount of 0.001 to 50 wt %.

8. The ink for ink jet recording according to claim 1, wherein a bubble height in the ink just after the ink has been shaken 30 times or more for 10 seconds, is 50 mm or less.

9. The ink for ink jet recording according to claim 1 or 2, which further comprises an antifoaming agent that is a compound itself existing on a liquid surface in place of a causative substance of foaming, and having no ability to give repulsive force resistant to thinning of a bubble film for itself, in which the antifoaming agent is at least one of alcohols, ethers, fatty acid esters, metal soaps, phosphates, silicones and nonionic surfactants.

10. The ink for ink jet recording according to claim 9, which further comprises the antifoaming agent in amount of 0.001 to 5 wt %.

11. The ink for ink jet recording according to claim 1 or 2, wherein the ink is prepared by applying a sonic vibration with energy equivalent to or higher than that of receiving at a recording head, during the process of producing the ink, in order to prevent bubbles from being generated by pressure applied to the ink at the recording head.

12. The ink for ink jet recording according to claim 1 or 2, wherein the ink is filtrated after an ink solution preparation by a filter having an effective diameter of 1 µm or less.

13. An ink jet recording process comprising recording an image on an image receiving material with the ink for ink jet recording according to claim 1 or 2.

14. An ink jet recording process comprising:
ejecting ink droplets depending on a recording signal onto an image-receiving material comprising a support having provided thereon an image-receiving layer that includes white inorganic pigment particles; and
recording an image on the image-receiving material,
wherein the ink droplets comprise the ink for ink jet recording according to claim 1 or 2.

15. The ink jet recording process according to claim 14, wherein the support is a chemical pulp, a mechanical pulp or a used paper pulp.

16. The ink jet recording process according to claim 14, wherein the white inorganic pigment particles is at least one of calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide or zinc carbonate.

17. The ink jet recording process according to claim 14, wherein an image-receiving material further comprises a back coat layer including a white pigment and an aqueous binder.

18. The ink for ink jet recording according to claim 1, wherein the ink further comprises at least one compound of alcohols, di-t-amylphenoxyethanol, 3-heptyl cellosolve, nonyl cellosolve, fatty acid esters, metal soaps, phosphates, silicones and nonionic surfactants selected from the group consisting of:

(1) alkyl allyl ether ethylene oxide addition product;
(2) HO—$(C_2H_4O)_n$—$(C_3H_6O)_m$—$(C_2H_4O)_n$—OH having a molecular weight of 500 to 10,000 and a $C_2H_4O$ content of 0% to 55%;
(3) $R_1(R_2)CHCOO(C_2H_4O)_n$ wherein $R_1$ and $R_2$ each represents an alkyl group having 1 to 10 carbon atoms, and n is from 1 to 8; and
(4) acetylenediol and its addition product to which 0 to 8 moles of ethylene oxide is added.

19. The ink for ink jet recording according to claim 18, wherein the at least one compound is present in an amount of 0.001% to 5% by weight.

20. The ink for ink jet recording according to claim 18, wherein the at least one compound is at least one of the silicones and the non-ionic surfactants.

21. The ink for ink jet recording according to claim 18, wherein the at least one compound is at least one of the nonionic surfactants.

* * * * *